(12) United States Patent
Inoue et al.

(10) Patent No.: US 11,313,824 B2
(45) Date of Patent: Apr. 26, 2022

(54) DETECTING DEVICE

(71) Applicant: MINEBEA MITSUMI Inc., Nagano (JP)

(72) Inventors: Fumihiro Inoue, Tokyo (JP); Shinya Otsuka, Tokyo (JP); Kosuke Yamamoto, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 181 days.

(21) Appl. No.: 16/681,015

(22) Filed: Nov. 12, 2019

(65) Prior Publication Data

US 2020/0158676 A1   May 21, 2020

(30) Foreign Application Priority Data

Nov. 16, 2018  (JP) .............................. JP2018-215756
Jul. 23, 2019  (JP) .............................. JP2019-135072

(51) Int. Cl.
   *G01N 27/22*   (2006.01)

(52) U.S. Cl.
   CPC ......... *G01N 27/226* (2013.01); *G01N 27/223* (2013.01); *G01N 27/228* (2013.01)

(58) Field of Classification Search
   USPC ................. 324/658, 664, 689; 73/73, 335.04
   See application file for complete search history.

(56) References Cited

U.S. PATENT DOCUMENTS

| 9,239,308 | B2 | 1/2016 | Tondokoro et al. |
| 9,658,270 | B2 | 5/2017 | Watanabe et al. |
| 2008/0257037 | A1* | 10/2008 | Isogai .................. G01N 27/225 73/335.04 |
| 2014/0116122 | A1* | 5/2014 | Lammel ............... G01N 27/041 73/73 |
| 2020/0033285 | A1* | 1/2020 | Nakane ................ G01N 27/223 |

FOREIGN PATENT DOCUMENTS

| JP | 5547296 | 7/2014 |
| JP | 6228865 | 11/2017 |

* cited by examiner

*Primary Examiner* — Vincent Q Nguyen
(74) *Attorney, Agent, or Firm* — IPUSA, PLLC

(57) ABSTRACT

The detecting device includes a detecting unit including a first electrode and a second electrode, the first electrode and the second electrode being used as a first capacitor. The detecting device includes a drive unit configured to apply a first drive signal to the first drive terminal such that the first drive signal is alternately inverted between a first period and a second period. The detecting device includes a converting unit configured to convert a charge charged at the signal terminal into a voltage and includes a difference processing unit configured to obtain a difference between the first output voltage and the second output voltage.

20 Claims, 23 Drawing Sheets

DETECTING DEVICE

CROSS-REFERENCE TO RELATED APPLICATION

This application claims priority under 35 U.S.C. § 119 to Japanese Patent Application Nos. 2018-215756, filed on Nov. 16, 2018, and 2019-135072, filed on Jul. 23, 2019, the contents of which are incorporated herein by reference in their entirety.

BACKGROUND OF THE INVENTION

1. Field of the Invention

The present disclosure relates to a detecting device such as a humidity detecting device, a method for controlling a detecting device, and a circuit for converting a charge into a voltage.

2. Description of the Related Art

Some humidity detecting devices as examples of detecting devices are capacitance types in which a moisture sensitive film is used as a dielectric substance, the moisture sensitive film being formed of a high polymer material of which a permittivity changes according to an amount of absorbed water. With respect to such a capacitance type humidity detecting device, a moisture sensitive film is disposed between electrodes, and humidity (relative humidity) is obtained by measuring capacitance possessed between the electrodes (e.g., Japanese Patent No. 5547296 referred to as Patent Document 1).

In the humidity detecting device disclosed in Patent Document 1, a sensor unit and a reference unit are arranged together on a substrate of the humidity detecting device. The sensor unit changes capacitance in accordance with humidity, and the reference unit provides constant capacitance that does not vary regardless of variation in the humidity. The humidity is measured by converting a difference in the capacitance between the sensor unit and the reference unit, into a voltage.

The circuit unit used in such a capacitance type humidity detecting device is known to convert an electric charge carried from the sensor unit into a voltage, by a charge amplifier (e.g., Japanese Patent No. 6228865 referred to as Patent Document 2). In addition to the charge amplifier, the circuit unit includes a drive circuit that drives the sensor unit in accordance with an alternating current (AC) drive signal as a square wave.

SUMMARY OF THE INVENTION

The present disclosure provides a detecting device. The detecting device includes a detecting unit including a first electrode and a second electrode, the first electrode and the second electrode being used as a first capacitor, the first electrode being electrically coupled to a first drive terminal, the second electrode being electrically coupled to a signal terminal, and the first capacitor being configured to change capacitance in response to a physical characteristic. The detecting device includes a drive unit configured to apply a first drive signal to the first drive terminal such that the first drive signal is alternately inverted between a first period and a second period. The detecting device includes a converting unit configured to convert a charge charged at the signal terminal into a voltage, the converting unit being configured to produce a first output voltage during the first period and a second output voltage during the second period, and the second output voltage being an inverted voltage with respect to the first output voltage. The detecting device includes a difference processing unit configured to obtain a difference between the first output voltage and the second output voltage.

DESCRIPTION OF THE PREFERRED EMBODIMENTS

Figure 1:
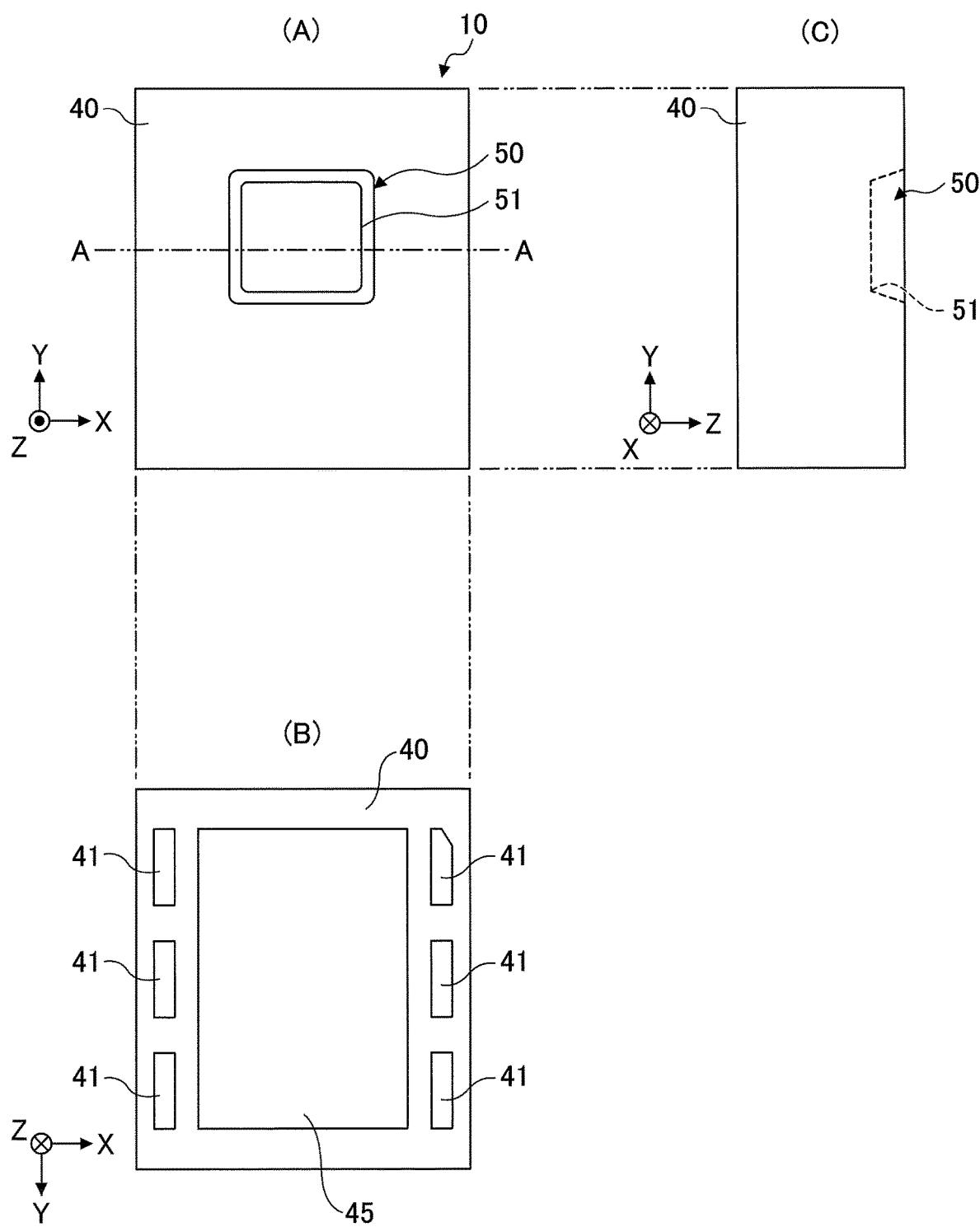
FIG. 1 is a diagram schematically illustrating an example of a configuration of a humidity detecting device according to one embodiment.

One or more embodiments will be hereinafter explained with reference to the drawings. In each figure, the same reference numerals are used to denote same elements; accordingly, for the elements described once, the explanation may be omitted. Note that in the present disclosure, humidity when simply referred to as humidity means relative humidity.

[Outline Configuration]

A configuration of a humidity detecting device 10 according to one embodiment will be described.

Figure 2:
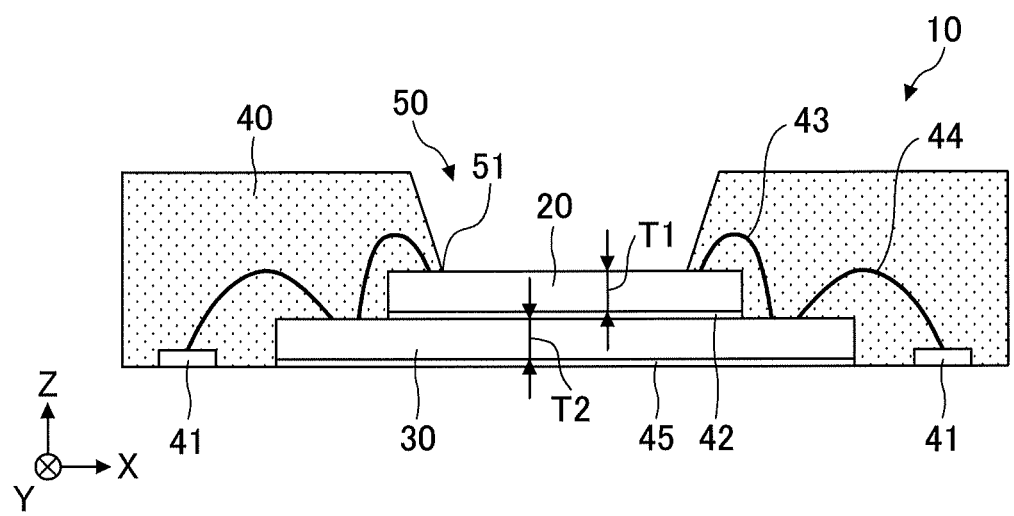
FIG. 2 is a schematic cross-sectional view taken along the A-A line in FIG. 1.

FIG. 1 is a diagram schematically illustrating an example of a configuration of a humidity detecting device 10 according to one embodiment. FIG. 1 (A) is a plan view of the humidity detecting device 10 when viewed from an upper surface thereof. FIG. 1 (B) is a bottom view of the humidity detecting device 10 when viewed from a lower surface thereof. FIG. 1 (C) is a side view of the humidity detecting device 10 when viewed from a lateral direction. FIG. 2 is a schematic cross-sectional view taken along the A-A line in FIG. 1 (A).

The humidity detecting device 10 has an approximately rectangular shape in which one of two opposite pairs of sides is parallel to an X direction and another is parallel to a Y direction. The X and Y directions are perpendicular to each other. The humidity detecting device 10 has a thickness in a Z direction perpendicular to the X direction and the Y direction. Note that the planar shape of the humidity detecting device 10 is not limited to a rectangle, and may be a circle, an ellipse, a polygon, or the like.

The humidity detecting device 10 includes a sensor chip 20 as a first semiconductor chip, an ASIC (Application Specific Integrated Circuit) chip 30 as a second semiconductor chip, mold resin 40, and a plurality of lead terminals 41.

The sensor chip 20 is disposed on the ASIC chip 30 via a first DAF (Die Attach Film) 42. In such a manner, the sensor chip 20 and the ASIC chip 30 are stacked.

The sensor chip 20 and the ASIC chip 30 are electrically connected to each other by a plurality of first bonding wires 43. The ASIC chip 30 and the plurality of lead terminals 41 are electrically connected to each other by a plurality of second bonding wires 44.

The stacked sensor chip 20 and ASIC chip 30, the plurality of first bonding wires 43, the plurality of second bonding wires 44, and the plurality of lead terminals 41 are sealed with the mold resin 40 to form a package. Such a packaging manner is also referred to as a PLP (Plating Lead Package) manner.

In the PLP manner, each of a thickness T1 of the sensor chip 20 and a thickness T2 of the ASIC chip 30 is preferably 200 µm or more.

As described in more detail below, on a lower surface of the ASIC chip 30, a second DAF 45 used when packaged in the PLP manner remains. The second DAF 45 serves to insulate the lower surface of the ASIC chip 30. The second DAF 45 and the plurality of lead terminals 41 are exposed on a lower surface of the humidity detecting device 10.

Each lead terminal 41 is formed of nickel or copper. Each of the first DAF 42 and the second DAF 45 is formed of an insulating material made of a mixture of epoxy, silicon, and silica, etc. The mold resin 40 is black resin capable of shielding light, such as epoxy resin.

An opening 50 is formed on an upper surface of the humidity detecting device 10 to expose a portion of the sensor chip 20 from the mold resin 40. For example, a wall portion forming the opening 50 is tapered, and an opening area of the opening 50 becomes smaller toward the bottom. With respect to the opening 50, a lowest opening that actually exposes the sensor chip 20 is referred to as an effective opening 51.

Figure 3:
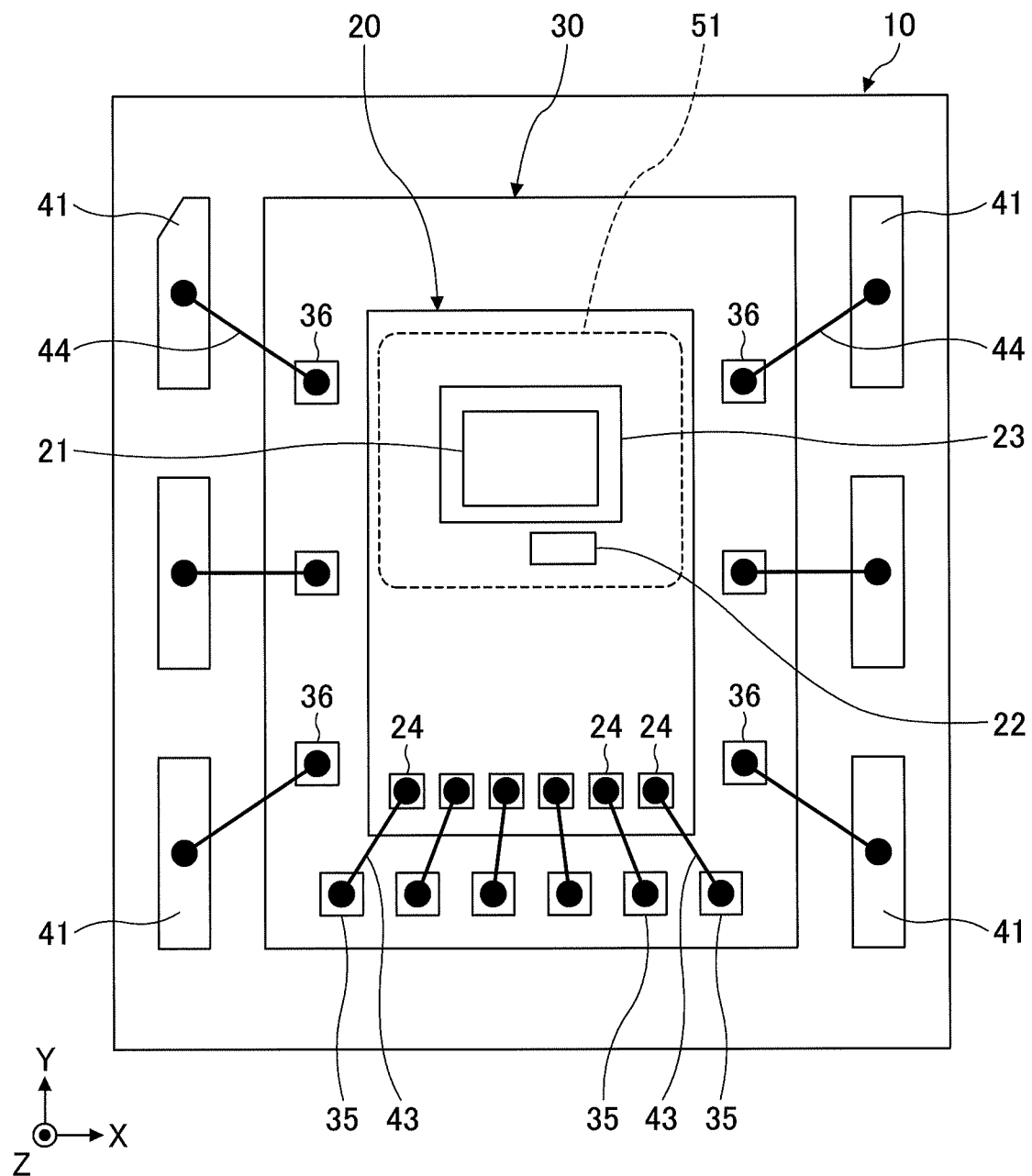
FIG. 3 is a plan view of an example of the humidity detecting device from which mold resin is removed.

FIG. 3 is a plan view of an example of the humidity detecting device 10 from which the mold resin 40 is removed. As illustrated in FIG. 3, with respect to each of the sensor chip 20 and the ASIC chip 30, the planar shape is an approximate rectangle that has two sides parallel to the X direction and two sides parallel to the Y direction. The sensor chip 20 is smaller than the ASIC chip 30, and is disposed on a surface of the ASIC chip 30 via the first DAF 42.

With respect to the sensor chip 20, a humidity detecting unit 21, a temperature detecting unit 22, and a heating unit 23 are provided in an area exposed by the effective opening 51. The heating unit 23 is formed on the underside of the humidity detecting unit 21, so as to cover a region where the humidity detecting unit 21 is formed.

A plurality of bonding pads (which are hereafter simply referred to as pads) 24 are formed in an end portion of the sensor chip 20. In the present embodiment, six pads 24 are formed. The pads 24 are formed of aluminum or an aluminum-silicon alloy (AlSi), for example.

The ASIC chip 30 is a semiconductor chip for signal processing and control. On the ASIC chip 30, a humidity-measurement processing unit 31, a temperature-measurement processing unit 32, a heating control unit 33, and a malfunction determining unit 34 are formed, as described below (see FIG. 14).

On a surface of the ASIC chip 30, a plurality of first pads 35 and a plurality of second pads 36 are also provided in a region that is not covered by the sensor chip 20. Each of the first and second pads 35 and 36 is formed of aluminum or an aluminum-silicon alloy (AlSi), for example.

The first pads 35 are connected to the respective pads 24 of the sensor chip 20 via the first bonding wires 43. The second pads 36 are connected to the respective lead terminals 41 via the second bonding wires 44. Each of the lead terminals 41 is disposed in the surroundings of the ASIC chip 30.

[Configuration of Sensor Chip]

Hereafter, a configuration of the sensor chip 20 will be described.

Figure 4:
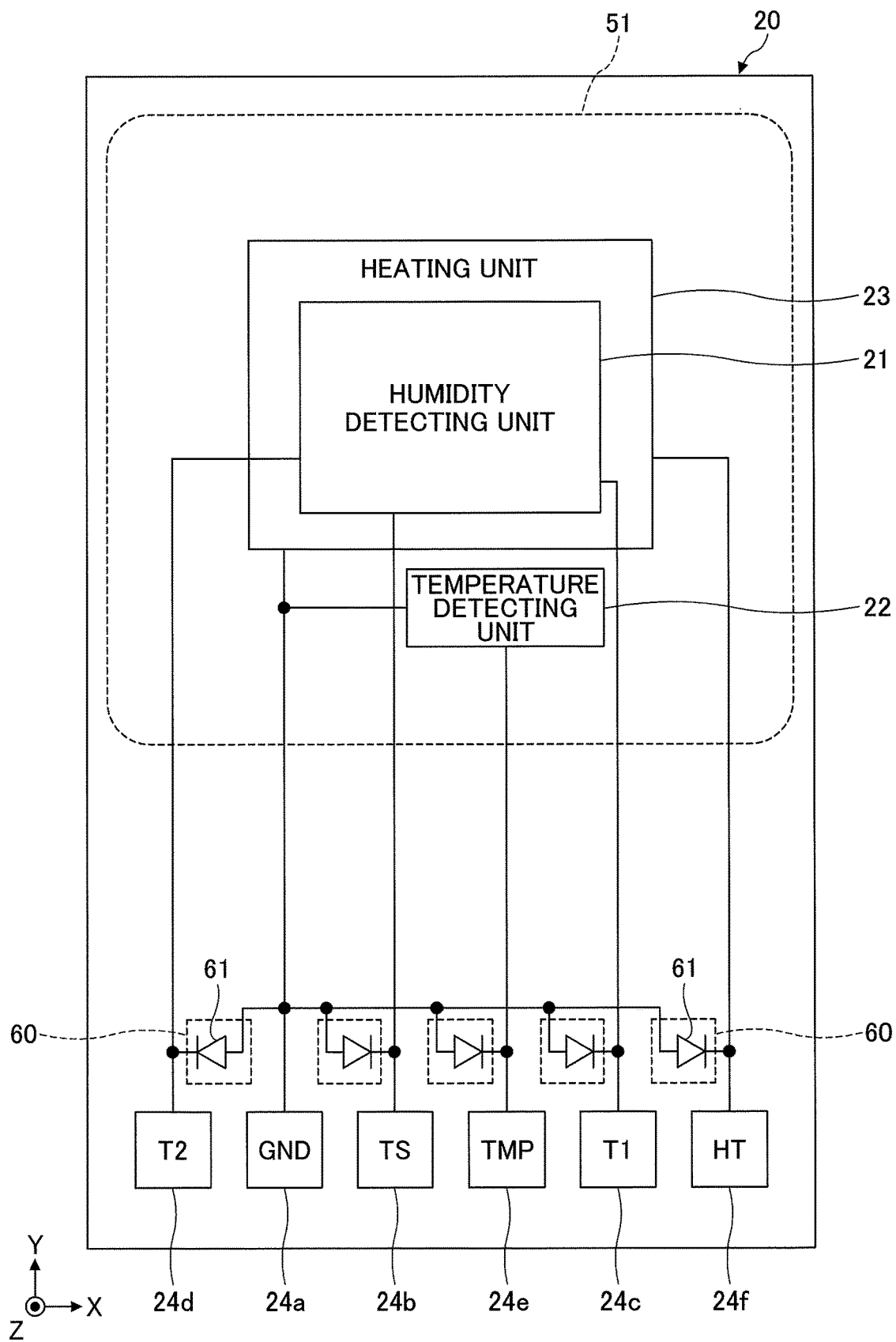
FIG. 4 is a schematic plan view of an example of a configuration of a sensor chip according to one embodiment.

FIG. 4 is a schematic plan view of an example of a configuration of the sensor chip 20. The pads 24 are terminals that are used for applying a voltage from the external or detecting a potential. In FIG. 4, the respective pads 24 illustrated in FIG. 3 are distinctively indicated by pads 24a to 24f. Note that when it is not necessary to distinguish between the pads 24a to 24f, they may be simply referred to as pads 24.

A pad 24a serves as a ground electrode terminal (GND) that is grounded to a ground potential. The pad 24a is electrically connected to units such as the temperature detecting unit 22 and the heating unit 23, via corresponding interconnect(s) or a substrate. The pad 24*a* is electrically connected to a p-type semiconductor substrate 70 (see FIG. 9) that is part of the sensor chip 20.

A pad 24*b* is a signal terminal (TS) that is electrically connected to a lower electrode 83 of the humidity detecting unit 21. A pad 24*c* is a first drive terminal (T1) that is electrically connected to an upper electrode 84 of the humidity detecting unit 21. A pad 24*d* is a second drive terminal (T2) that is electrically connected to a reference electrode 82 (see FIG. 9) of the humidity detecting unit 21. The lower electrode 83 serves as a capacitance detecting electrode that a charge amplifier 301 (see FIG. 15) as described below uses for detecting capacitance.

A pad 24*e* is a terminal for temperature detection (TMP) that is electrically connected to the temperature detecting unit 22. The pad 24*e* is used to acquire a detected signal of temperature. A pad 24*f* is a terminal for heating (HT) that is electrically connected to the heating unit 23. The pad 24*f* is used to supply a drive voltage for driving the heating unit 23.

Electrostatic discharge (ESD) protection circuits 60 are respectively connected to the pads 24*b* to 24*f* other than the pad 24*a*. Each ESD protection circuit 60 is connected between the pad 24*a* as a ground electrode terminal and a given pad as an input terminal or an output terminal from among the pads 24*b* to 24*f*. In the present embodiment, each ESD protection circuit 60 includes one diode 61. An anode of the diode 61 is connected to the pad 24*a*, and a cathode is connected to a given pad among the pads 24*b* to 24*f*.

Each ESD protection circuit 60 is preferably disposed in proximity to the pads 24*b* to 24*f* so as to be as far as possible away from the effective opening 51. Each ESD protection circuit 60 is sealed with the mold resin 40. Thereby, unwanted charge caused by the photoelectric effect is not generated.

[Configuration of ESD Protection Circuit]

Hereafter, a configuration of the ESD protection circuit 60 will be described.

Figure 5:
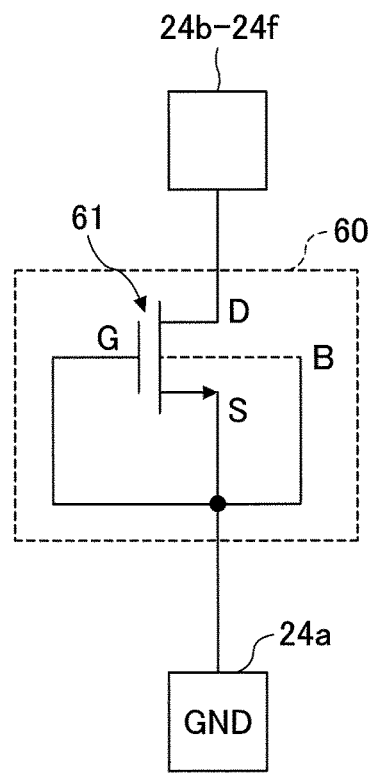
FIG. 5 is a circuit diagram illustrating an example of a configuration of an ESD protection circuit according to one embodiment.

FIG. 5 is a circuit diagram illustrating an example of a configuration of the ESD protection circuit 60. As illustrated in FIG. 5, a diode 61 that constitutes the ESD protection circuit 60 is formed by an N-channel MOS (Metal-Oxide-Semiconductor) transistor (which is hereafter referred to as an NMOS transistor), for example. Specifically, the diode 61 is formed by short-circuiting (so-called diode connection) a source, a gate, and a back gate of the NMOS transistor. Such a short circuit serves as an anode. A drain of the NMOS transistor serves as a cathode.

Figure 6:
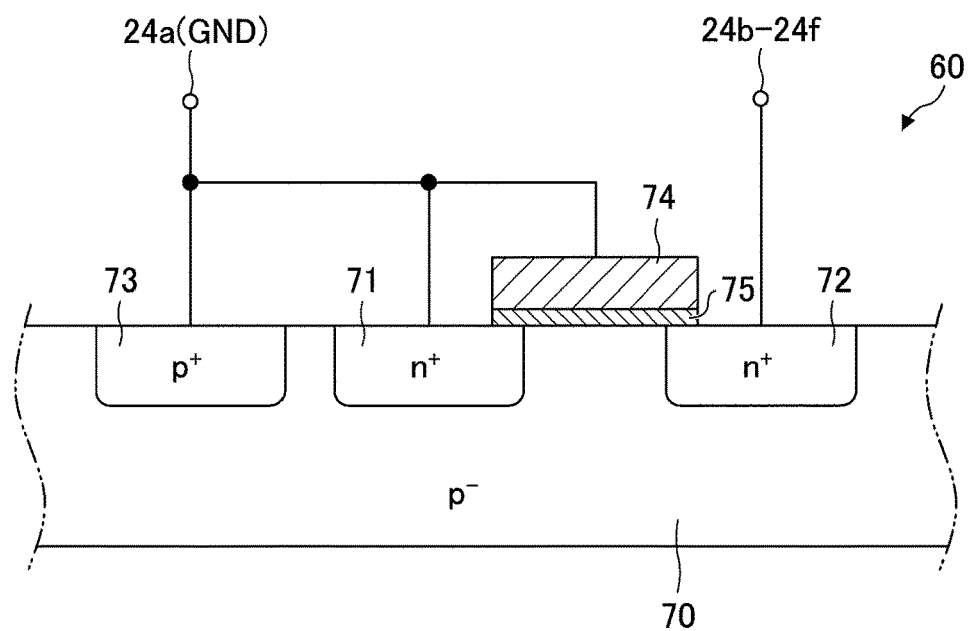
FIG. 6 is a diagram illustrating an example of a layer structure of an NMOS transistor that constitutes the ESD protection circuit.

FIG. 6 is a diagram illustrating an example of a layer structure of the NMOS transistor that constitutes the ESD protection circuit 60. The NMOS transistor has two n-type diffusion layers 71 and 72, each of which is formed in a surface layer of a p-type semiconductor substrate 70 for constituting part of the sensor chip 20, a contact layer 73, and a gate electrode 74. The gate electrode 74 is formed on a surface of the p-type semiconductor substrate 70 via a gate insulating film 75. The gate electrode 74 is disposed between the two n-type diffusion layers 71 and 72.

For example, the n-type diffusion layer 71 serves as a source, and the n-type diffusion layer 72 serves as a drain. The contact layer 73 is a low resistance layer (p-type diffusion layer) for an electrical connection to the p-type semiconductor substrate 70 as a back gate. The n-type diffusion layer 71, the gate electrode 74, and the contact layer 73 are commonly connected to be short-circuited. Such a short circuit serves as an anode, and the n-type diffusion layer 72 serves as a cathode.

The p-type semiconductor substrate 70 is a p-type silicon substrate, for example. The gate electrode 74 is formed of metal or polycrystalline silicon (polysilicon), for example. For example, a gate insulating film 75 is formed by an oxide film such as silicon dioxide.

[Configuration of Humidity Detecting Unit]

Hereafter, a configuration of the humidity detecting unit 21 will be described.

Figure 7:
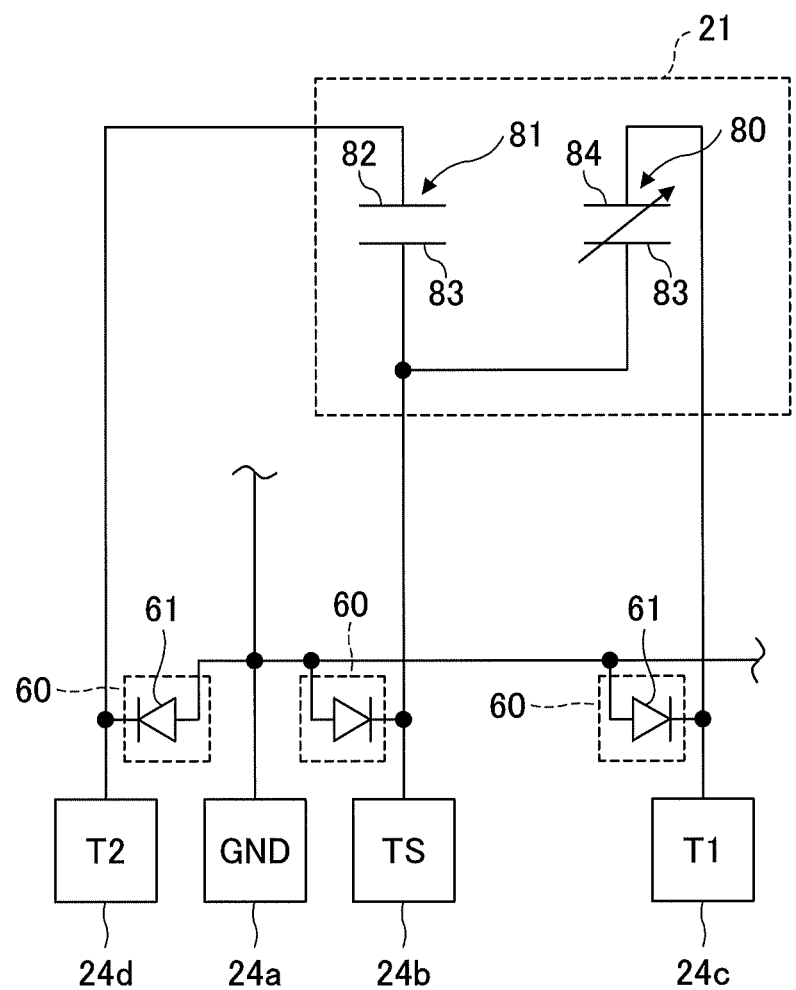
FIG. 7 is a circuit diagram illustrating an example of a configuration of a humidity detecting unit according to one embodiment.

FIG. 7 is a circuit diagram illustrating an example of a configuration of the humidity detecting unit 21. As illustrated in FIG. 7, the humidity detecting unit 21 includes a capacitor 80 for humidity detection and a capacitor 81 for reference, each of which is a parallel-plate type.

One electrode (the lower electrode 83) of the humidity detecting unit 21 is connected to the pad 24*b* as the signal terminal TS. Another electrode (the upper electrode 84) of the humidity detecting unit 21 is connected to the pad 24*c* as the first drive terminal T1. One electrode of the capacitor 81 for reference is common to the one electrode (the lower electrode 83) of the humidity detecting unit 21. Another electrode (the reference electrode 82) of the capacitor 81 for reference is connected to the pad 24*d* as the second drive terminal T2.

A moisture sensitive film 86 is provided between the electrodes of the capacitor 80 for humidity detection, as described below. The moisture sensitive film 86 is formed of a high polymeric material such as polyimide, which absorbs moisture of the air and changes a permittivity according to an amount of absorbed water. The capacitor 80 for humidity detection changes capacitance in accordance with an amount of moisture absorbed by the moisture sensitive film 86.

A second insulating film 111 (see FIG. 9) is provided between the electrodes of the capacitor 81 for reference, as described below. The second insulating film 111 is formed of an insulating material such as silicon dioxide ($SiO_2$) which does not absorb moisture. Accordingly, capacitance of the capacitor 81 for reference does not change in accordance with humidity. Note that no change of capacitance also means any change being negligible.

An amount of moisture contained in the moisture sensitive film 86 changes depending on humidity in surroundings of the humidity detecting device 10. In this case, relative humidity can be measured by detecting a difference between capacitance of the capacitor 80 for humidity detection and capacitance of the capacitor 81 for reference. Such relative humidity is measured by a humidity-measurement processing unit 31 (see FIG. 14) in the ASIC chip 30.

[Configuration of Temperature Detecting Unit]

Hereafter, a configuration of the temperature detecting unit 22 will be described.

Figure 8:
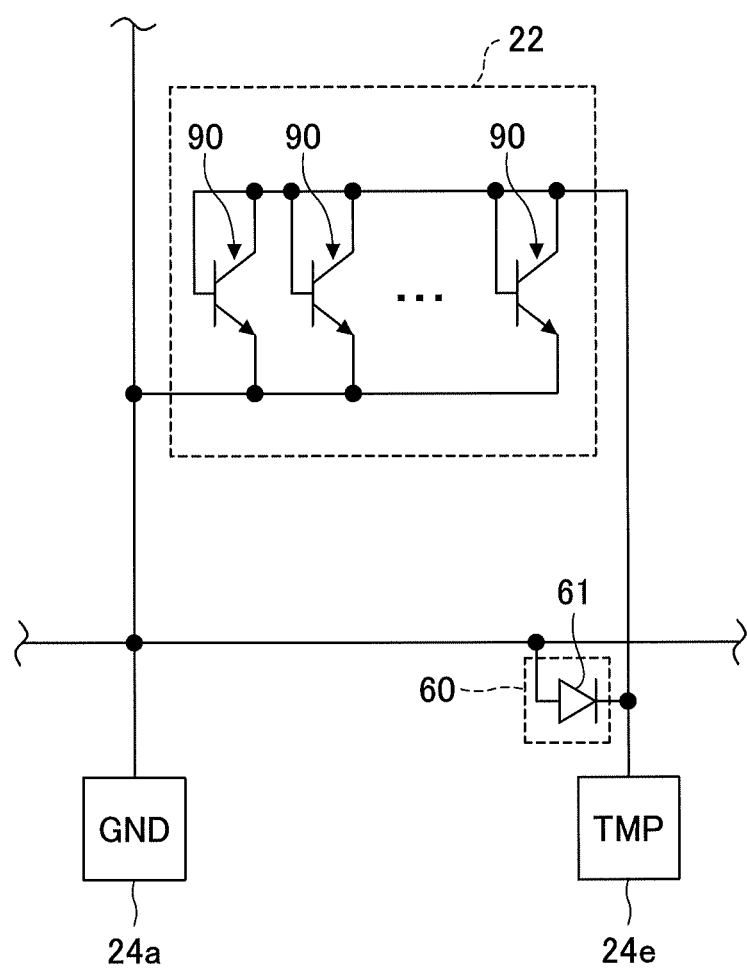
FIG. 8 is a circuit diagram illustrating an example of a configuration of a temperature detecting unit according to one embodiment.

FIG. 8 is a circuit diagram illustrating an example of a configuration of the temperature detecting unit 22. The temperature detecting unit 22 is a bandgap type temperature sensor that detects temperature by utilizing a physical characteristic changing proportionally depending on a change in temperature, with respect to a bandgap of a semiconductor. For example, the temperature detecting unit 22 may include one or more bipolar transistors in which any two from among a base, an emitter and a collector are connected to each other to form two terminals. By detecting resistance between the two terminals, temperature can be measured.

As illustrated in FIG. 8, in the present embodiment, the temperature detecting unit 22 includes a plurality of (e.g., eight) npn-type bipolar transistors 90 connected in parallel, whose bases are connected to respective collectors. In such a manner, with respect to each of the plurality of bipolar transistors 90 connected in parallel, a junction area of a p-n junction is increased, thereby improving resistance properties in terms of ESD.

An emitter of each bipolar transistor 90 is connected to the pad 24a as a ground electrode terminal. A base and a collector of each bipolar transistor 90 are connected to the pad 24e as a terminal for temperature detection.

Temperature measurement is performed based on a potential at the pad 24e by a temperature-measurement processing unit 32 (see FIG. 14) in the ASIC chip 30.

[Element Structure of Sensor Chip]

Hereafter, an element structure of the sensor chip 20 will be described.

Figure 9:
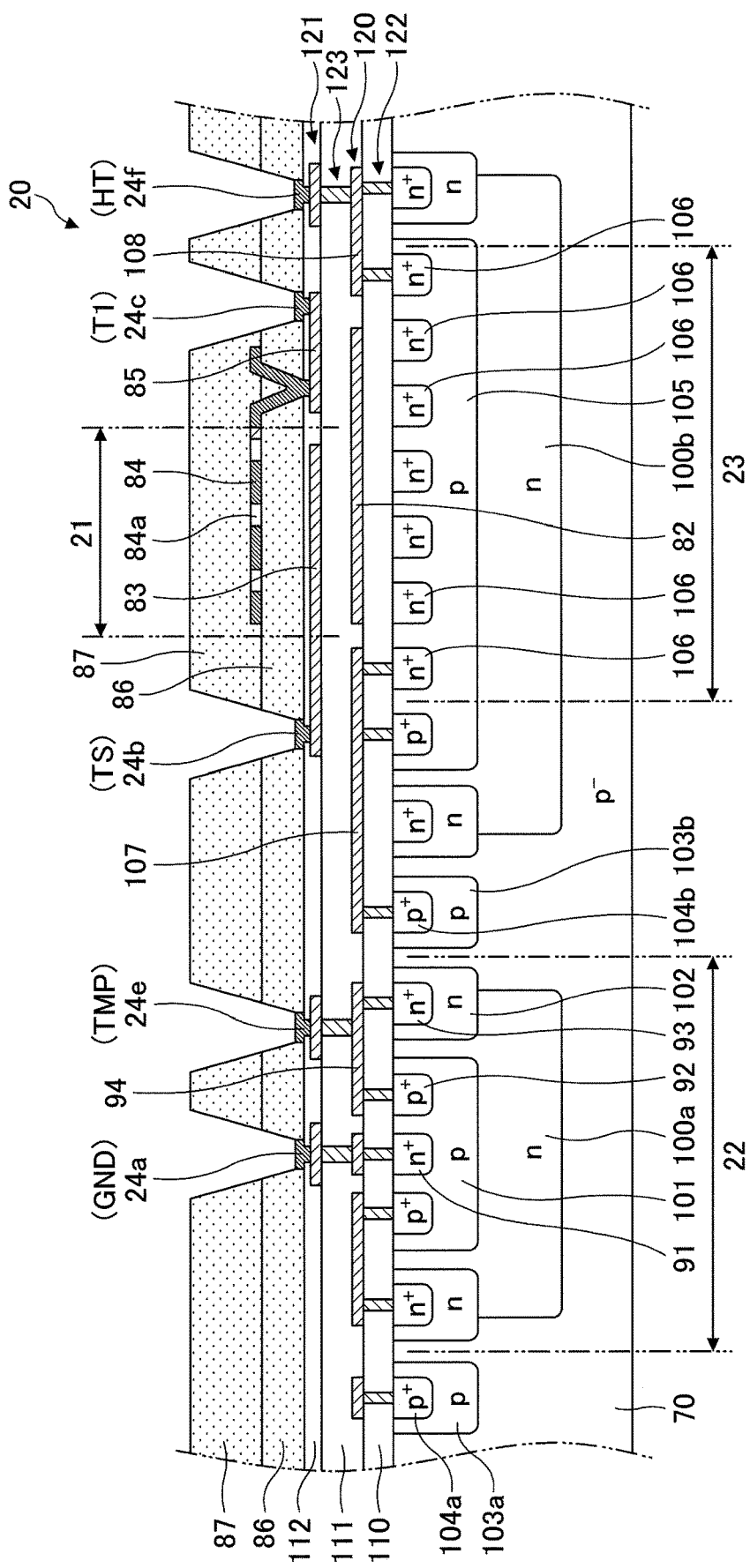
FIG. 9 is a schematic cross-sectional view for explaining an example of an element structure of the sensor chip.

FIG. 9 is a schematic cross-sectional view for explaining an example of an element structure of the sensor chip 20. Note that in FIG. 9, the pads 24a, 24b, 24c and 24e are illustrated in a same cross section as the humidity detecting unit 21, the temperature detecting unit 22, and the heating unit 23, for facilitating understanding of the structure. This, however, does not mean that the pads are actually present in a same cross section. Also, a cross-section of each of the humidity detecting unit 21, the temperature detecting unit 22 and the heating unit 23 is simplified to facilitate understanding of the structure; accordingly, a positional relationship between those units, etc. is different from an actual one.

As illustrated in FIG. 9, the sensor chip 20 is formed using the p-type semiconductor substrate 70 described above. In the p-type semiconductor substrate 70, a first deep-n-well 100a and a second deep-n-well 100b are formed. The temperature detecting unit 22 is formed in the first deep-n-well 100a. The heating unit 23 is formed in the second deep-n-well 100b.

In a surface layer of the p-type semiconductor substrate 70 in which neither the first deep-n-well 100a nor the second deep-n-well 100b is formed, p-wells 103a and 103b are formed. In respective surface layers of the p-well 103a and 103b, contact layers 104a and 104b each of which includes a p-type diffusion region are formed. Each of the contact layers 104a and 104b is a low resistance layer (p-type diffusion layer) for electrically connecting a given interconnect layer formed over the p-type semiconductor substrate 70 to the p-type semiconductor substrate 70.

In a surface layer of the first deep-n-well 100a, a p-well 101 and an n-well 102 are formed. An n-type diffusion layer 91 and a p-type diffusion layer 92 are formed in a surface layer of the p-well 101. An n-type diffusion layer 93 is formed in a surface layer of the n-well 102. The n-type diffusion layer 91, the p-type diffusion layer 92, and the n-type diffusion layer 93 constitute the npn-type bipolar transistor 90 described above, and serve as an emitter, a base, and a collector, respectively.

A p-well 105 is formed in a surface layer of the second deep-n-well 100b. One or more n-type diffusion layers 106 may be formed in a surface layer of the p-well 105. In the present embodiment, a plurality of n-type diffusion layers 106 are formed. For example, n-type diffusion layers 106 extend in a direction perpendicular to a plane of the paper, and are wholly arranged in a one-dimensional grating pattern (see FIG. 11). Each n-type diffusion layer 106 has a predetermined resistance value (e.g., a sheet resistance value of about 3Ω), and serves as a resistor that generates heat when a current flows. In such a manner, each n-type diffusion layer 106 constitutes the heating unit 23.

Each layer in the p-type semiconductor substrate 70 is formed by a general semiconductor manufacturing process (CMOS process). Each n-type diffusion layer 106 as a resistor is formed by a same manufacturing process as the n-type diffusion layers 91 and 93 that constitute part of the temperature detecting unit 22. The n-type diffusion layers 106, 91, and 93 are formed simultaneously by an ion-implantation process in which a substrate is doped with an impurity used in ion implantation of an n-type impurity (e.g., phosphorus). In such a manner, each n-type diffusion layer 106 as a resistor has a same depth from the surface of the p-type semiconductor substrate 70 as the n-type diffusion layers 91 and 93 that constitute part of the temperature detecting unit 22. Each n-type diffusion layer 106 may have a same depth from the surface of the p-type semiconductor substrate 70 as the p-type diffusion layer 92 that constitutes part of the temperature detecting unit 22.

Note that the n-type diffusion layers 106, 91, and 93 may be formed by a heating diffusion process in which an impurity is added by heat treatment, instead of an ion implantation process.

The n-type diffusion layers 71 and 72 of each of the ESD protection circuit 60 described above are also formed by a same manufacturing process (ion implantation process or thermal diffusion process) as the n-type diffusion layers 106, 91, and 93. The contact layer 73 is formed by a same manufacturing process (ion implantation process or thermal diffusion process) as the p-type diffusion layer 92, the contact layers 104a and 104b, and the like.

Other layers in the p-type semiconductor substrate 70 primarily serve as contact layers; accordingly, the explanation is omitted for those layers.

A first insulating film 110, the second insulating film 111, and a third insulating film 112 are sequentially laminated on the surface of the p-type semiconductor substrate 70. These are formed of an insulating material such as silicon dioxide ($SiO_2$) or silicon nitride (SiN).

A first interconnect layer 120 is formed on the first insulating film 110. A second interconnect layer 121 is formed on the second insulating film 111. The first interconnect layer 120 is overlaid with the second insulating film 111. The second interconnect layer 121 is overlaid with the third insulating film 111. Each of the first interconnect layer 120 and the second interconnect layer 121 is formed of a conductive material such as aluminum.

A first plug layer 122 that has a plurality of first plugs for connecting the first interconnect layer 120 to the p-type semiconductor substrate 70 is formed in the first insulating film 110. A second plug layer 123 that has a plurality of second plugs for connecting the first interconnect layer 120 to the second interconnect layer 121 is formed in the second insulating film 111. Each of the first plug layer 122 and the second plug layer 123 is formed of a conductive material such as tungsten.

For example, an interconnect 94 for connecting a base of each bipolar transistor 90 to a corresponding collector is formed in the first interconnect layer 120, and is connected to the p-type diffusion layers 92 and the n-type diffusion layers 93 via the first plug layer 122. The interconnect 94 is also connected to the pad 24e as a terminal for temperature detection via the second plug layer 123 and the second interconnect layer 121. The n-type diffusion layer 91 as an emitter of each bipolar transistor 90 is also connected to the pad 24a as a ground electrode terminal via the first plug layer 122, the first interconnect layer 120, and the second interconnect layer 121.

An interconnect 107 for grounding one end portion of the heating unit 23 to a ground potential is formed by the first interconnect layer 120, and is connected to each n-type diffusion layer 106 and the contact layer 104b via the first plug layer 122. In the following description, the interconnect 107 is also referred to as a ground interconnect 107.

An interconnect 108 for connecting another end portion of the heating unit 23 to the pad 24f as a terminal for heating is connected to each n-type diffusion layer 106 via the first plug layer 122, and is connected to the pad 24f via the second plug layer 123 and the second interconnect layer 121. Note that the interconnect 108 is preferably wider than other signal interconnects in order to prevent electromigration damage due to a large current flowing to the heating unit 23. In the following description, the interconnect 108 is also referred to as a power supply interconnect 108.

The reference electrode 82 used for the capacitor 81 for reference is formed by the first interconnect layer 120, and is connected to the pad 24d (not shown in FIG. 9) as the second drive terminal T2, via the second plug layer 123 and the second interconnect layer 121.

The lower electrode 83 used for the capacitor 80 for humidity detection is formed by the second interconnect layer 121, and is connected to the pad 24b as the signal terminal TS. Further, an interconnect 85 for connecting the upper electrode 84, which is used for the capacitor 80 for humidity detection, to the pad 24c as the first drive terminal T1 is formed by the second interconnect layer 121. Note that the lower electrode 83 is disposed at a location opposite to the reference electrode 82, via the second insulating film 111.

Each of the pads 24a to 24f is formed of a conductive material such as aluminum, and is disposed on the third insulating film 112. Each of the pads 24a to 24f is connected to the second interconnect layer 121, passing through the third insulating film 112.

The moisture sensitive film 86 is formed on the third insulating film 112. The moisture sensitive film 86 is formed of a polymeric material that is capable of easily absorbing and desorbing water molecules, with a film thickness in the range of 0.5 μm to 1.5 μm. The moisture sensitive film 86 is a polyimide film that has a thickness of 1 μm, for example. Note that a polymeric material that forms the moisture sensitive film 86 is not limited to polyimide, and may include cellulose, polymethyl methacrylate (PMMA), polyvinyl alcohol (PVA), or the like.

An upper surface of the moisture sensitive film 86 is flat, and on this upper surface, a flat-plate type upper electrode 84 is formed. The upper electrode 84 is formed in a location opposite to the lower electrode 83, via the moisture sensitive film 86. A portion of the upper electrode 84 is connected to the interconnect 85. For example, the upper electrode 84 is a conductive film that is formed of aluminum metal that has a thickness of 200 nm, or the like. A plurality of openings 84a are also formed in the upper electrode 84 in order to efficiently incorporate water molecules in the air into the moisture sensitive film 86.

An overcoat film 87 is disposed on the moisture sensitive film 86 so as to cover the upper electrode 84. The overcoat film 87 is formed of a polymeric material, e.g., a same material as the moisture sensitive film 86. A thickness of the overcoat film 87 is 0.5 μm to 10 μm, for example.

Openings are formed in the moisture sensitive film 86 and the overcoat film 87 in order to expose the pads 24a to 24f.

In such a manner, the capacitor 80 for humidity detection, which is a parallel-plate type, is configured by the lower electrode 83 and the upper electrode 84. Also, the capacitor 81 for reference, which is a parallel-plate type, is configured by the lower electrode 83 and the reference electrode 82. The capacitor 80 for humidity detection as well as the capacitor 81 for reference are disposed over the heating unit 23.

In such a manner, when the heating unit 23 generates heat, the moisture sensitive film 86 between the lower electrode 83 and the upper electrode 84 is heated to evaporate a liquid, so that an amount of water absorbed by the moisture sensitive film 86 varies. Accordingly, permittivity of the moisture sensitive film 86 varies, so that capacitance of the capacitor 80 for humidity detection thereby varies. The temperature detecting unit 22 detects a change in temperature caused by the heating unit 23.

[Planar Shape of Heating Unit]

Figure 10:
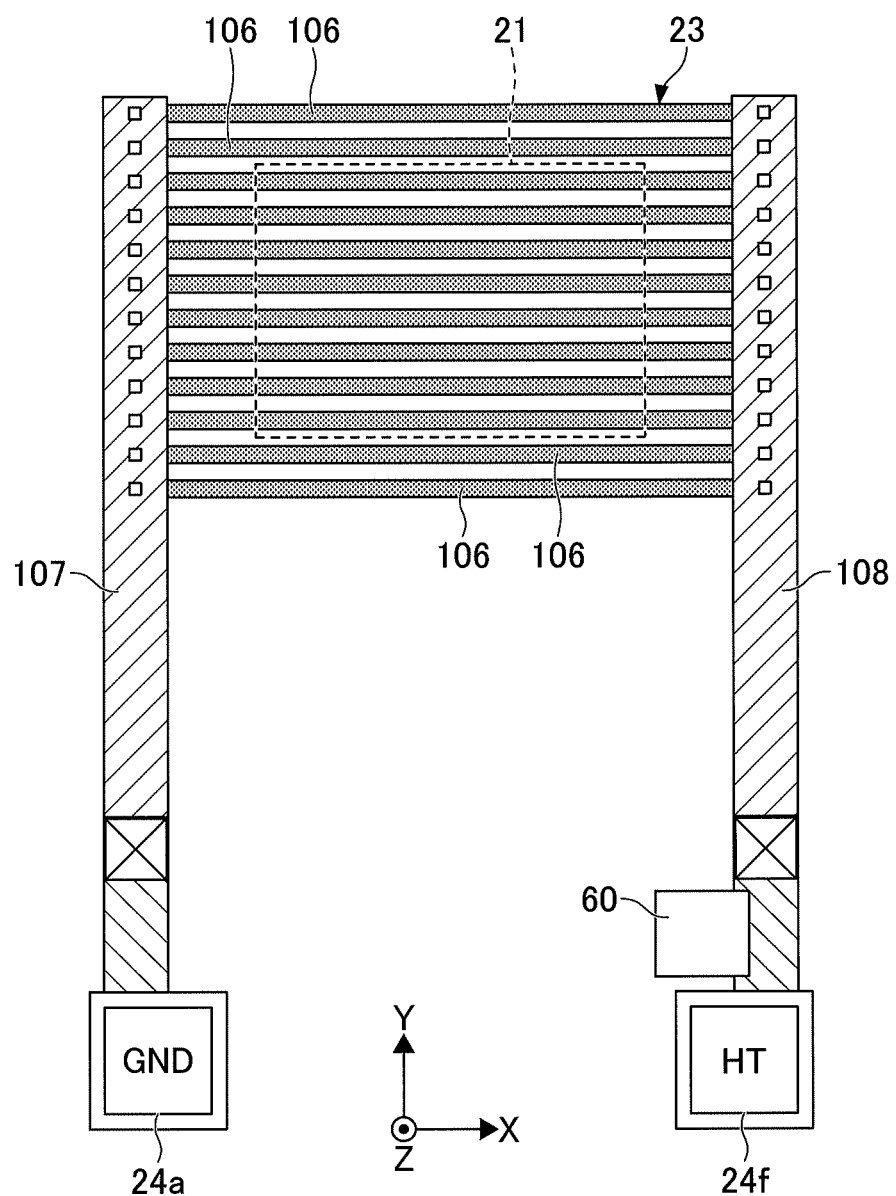
FIG. 10 is a schematic plan view of an example of the planar shape of a heating unit according to one embodiment.

FIG. 10 is a schematic plan view of an example of the planar shape of the heating unit 23. In FIG. 10, an interconnect shape or the like is schematically illustrated, which differs from an actual layout.

As illustrated in FIG. 10, n-type diffusion layers 106 that constitute the heating unit 23 are arranged in a one-dimensional grid pattern, in which a plurality of elongated, rectangular regions are arranged parallel to each other. One end of each of the n-type diffusion layers 106 in the one-dimensional grid pattern is connected to the interconnect 107, and another end is connected to the power supply interconnect 108. The heating unit 23 is positioned below the humidity detecting unit 21 so as to cover, in a plan view, the entire humidity detecting unit 21.

Note that, as described below in detail, the ground interconnect 107 does not actually have a linear shape, and extends on an XY plane and serves as a shielding layer for shielding one or more signal lines, or the like.

[Planar Shape of Electrodes]

Figure 11:
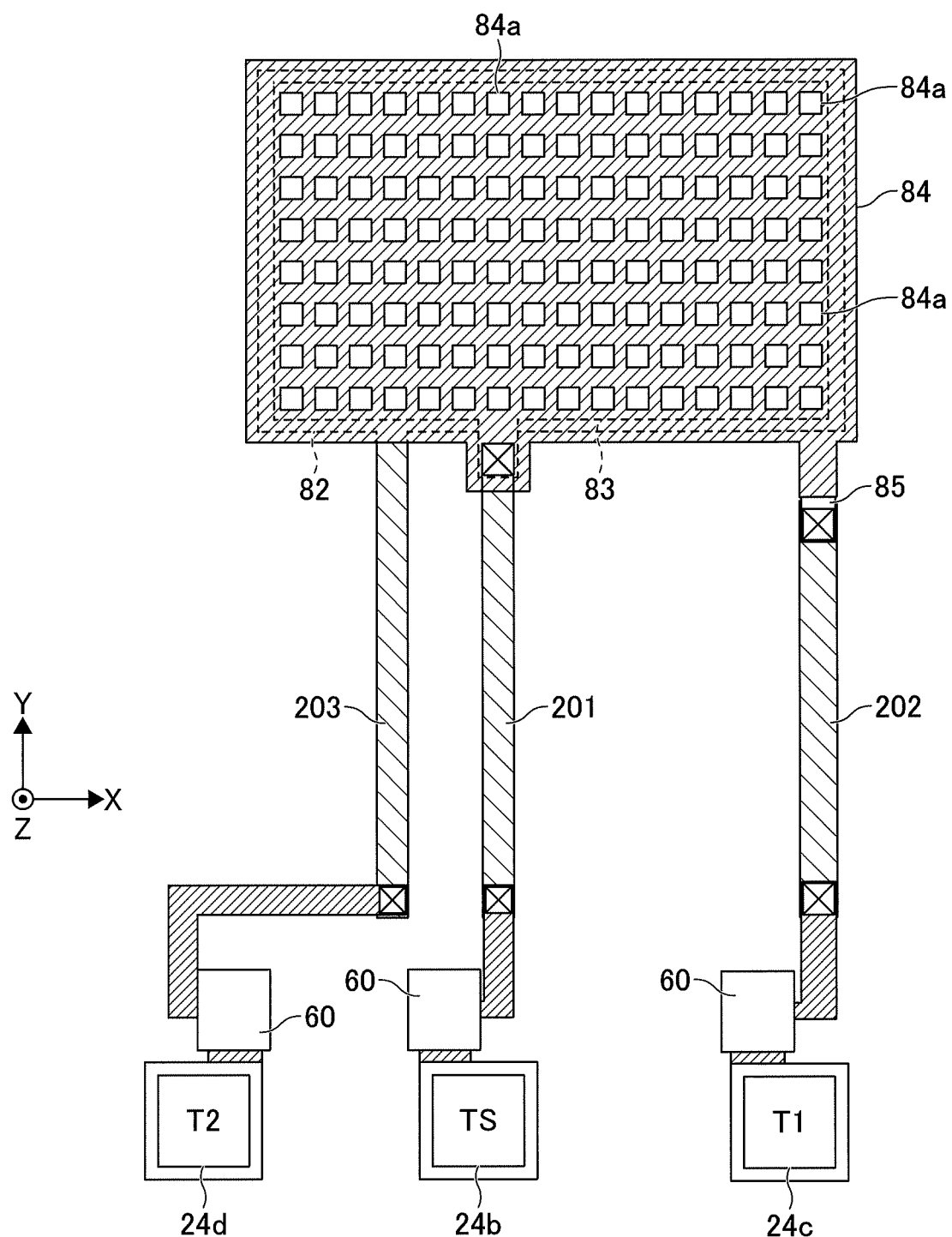
FIG. 11 is a schematic plan view of an example of the planar shape of each electrode of the humidity detecting unit.

FIG. 11 is a schematic plan view of an example of a planar shape of each electrode of the humidity detecting unit 21.

As illustrated in FIG. 11, the reference electrode 82, the upper electrode 84, and the lower electrode 83 have an approximately same shape, and each have a rectangular shape. The upper electrode 84 is formed so as to cover the lower electrode 83 and the reference electrode 82. The reference electrode 82, the lower electrode 83, and the upper electrode 84 are laminated in this order from a side of the p-type semiconductor substrate 70.

Preferably, the reference electrode 82 and the upper electrode 84 have an approximately same size. The lower electrode 83 is preferably smaller than the reference electrode 82 and the upper electrode 84.

A given opening 84a is preferably as small as possible. Leakage of an electric field in the air is prevented as each opening 84a is small. Thereby, when a foreign substance is attached (see FIG. 13), a change in capacitance between the lower electrode 83 and the upper electrode 84 is suppressed. In the present embodiment, minute and many openings 84a are formed. Note that each opening 84a is not limited to a square, and may be an elongated rectangle or a circle.

Signal lines 201 to 203 are interconnects formed by the first interconnect layer 120 and the second interconnect layer 121. The signal line 201 is an interconnect connected between the lower electrode 83 of the humidity detecting unit 21 and the pad 24b. The signal line 202 is an interconnect connected between the upper electrode 84 of the humidity detecting unit 21 and the pad 24c.

Note that the interconnect 85 described above constitutes part of the signal line 202.

[Planar Shape of Electrodes]

Figure 12:
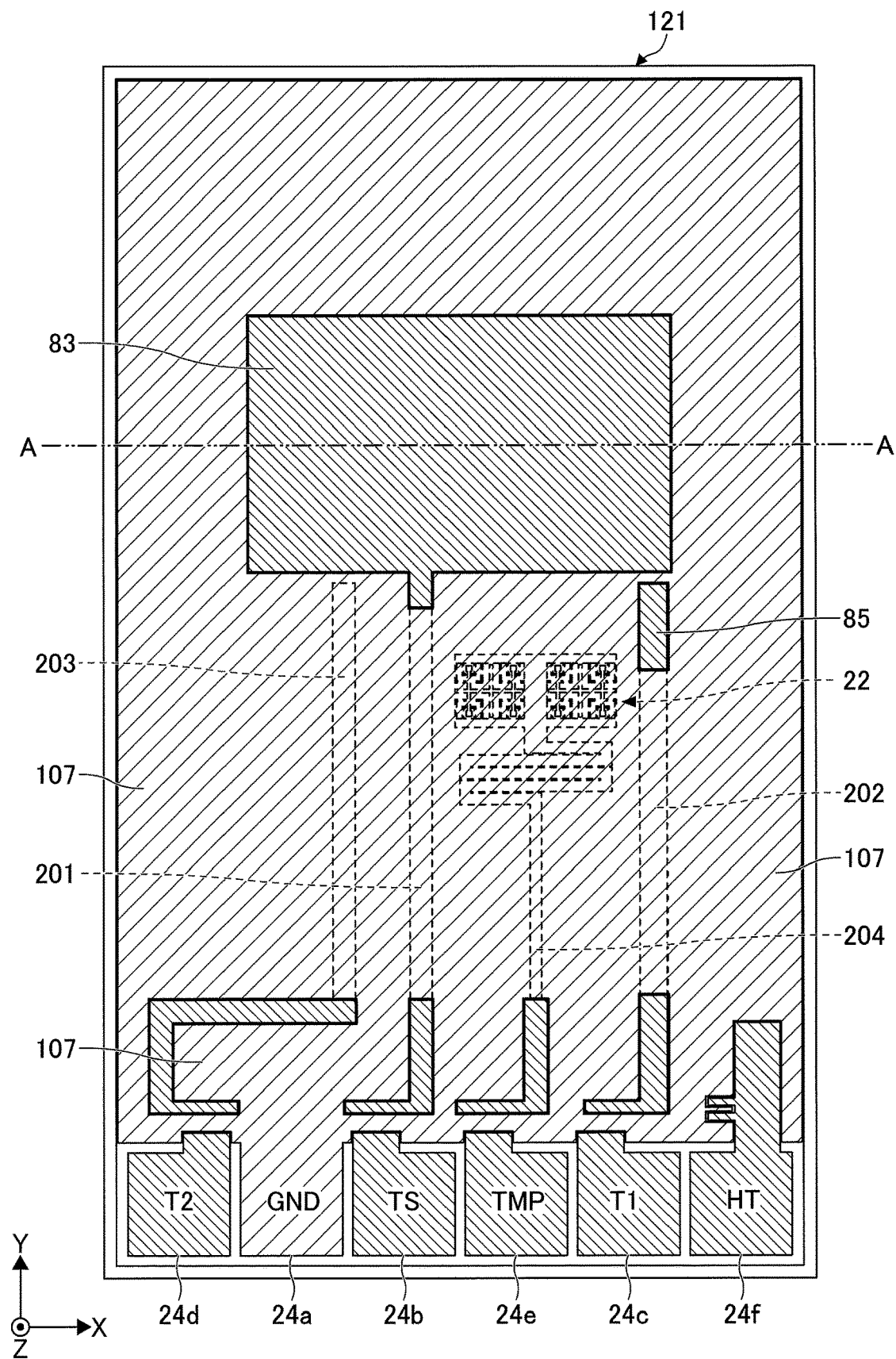
FIG. 12 is a plan view of an example of a layout of a second interconnect layer according to one embodiment.

FIG. 12 is a plan view of a layout of the second interconnect layer 121. As illustrated in FIG. 12, the lower electrode 83, the ground interconnect 107, the interconnect 85, and the like are formed by the second interconnect layer 121.

The ground interconnect 107 partially adjoins interconnects such as the interconnect 85, via narrow slits, where one or more narrow slits are formed in the ground interconnect 107. The ground interconnect 107 is disposed on the approximately entire surface. In such a manner, the ground interconnect 107 covers the signal lines 201 to 203, the signal line 204 connected to the temperature detecting unit 22, and the like, and serves as a shield layer.

[Layer Structure of Electrodes]

Figure 13:
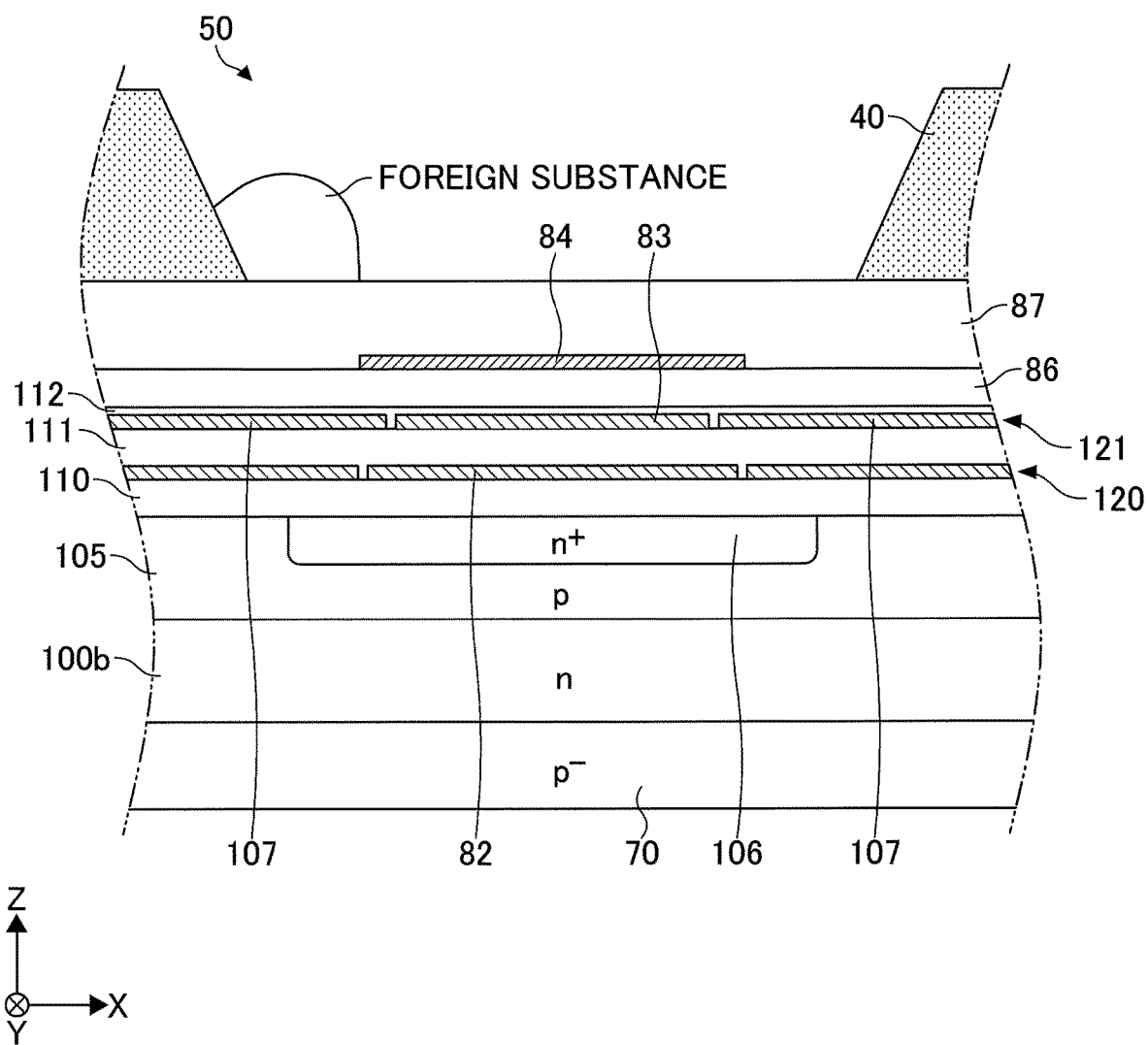
FIG. 13 is a schematic cross-sectional view taken along the A-A line in FIG. 12.

FIG. 13 is a schematic cross-sectional view taken along the A-A line in FIG. 12. As illustrated in FIG. 13, a lower electrode 83 as a capacitance detecting electrode is disposed above a reference electrode 82, and is not in proximity to a p-type semiconductor substrate 70. Thereby, parasitic capacitance provided between the lower electrode 83 and the p-type semiconductor substrate 70 is suppressed.

Also, an upper electrode 84 is disposed above the lower electrode 83. In the surroundings of the lower electrode 83, a ground interconnect 107 is disposed in proximity to the lower electrode 83. Such a configuration has a shield effect of confining an electric field. Thereby, as illustrated in FIG. 13, for example, even when foreign substances such as water droplets, which have a large relative permittivity and cause the change in the capacitance provided between the lower electrode 83 and the upper electrode 84, are attached in the opening 50, the influence of the capacitance associated with the lower electrode 83 is suppressed because the electric field is shielded by the ground interconnect 107.

Note that when an area of the lower electrode 83 is smaller than that of each of the reference electrode 82 and the upper electrode 84, the effect of confining an electric field associated with the lower electrode 83 is improved.

Further, when the lower electrode 83 is shared by the capacitor 80 for humidity detecting and the capacitor 81 for reference, in a case where the reference electrode 82, the upper electrode 84, and the lower electrode 83 are formed in a laminated structure, a chip area is decreased, so that the humidity detecting device 10 can be thereby downsized.

In FIG. 13, a given interconnect disposed adjacent to the reference electrode 82 is formed by the first interconnect layer 120, and is grounded to a ground potential.

[Configuration of ASIC Chip]

Hereafter, a configuration of the ASIC chip 30 will be described.

Figure 14:
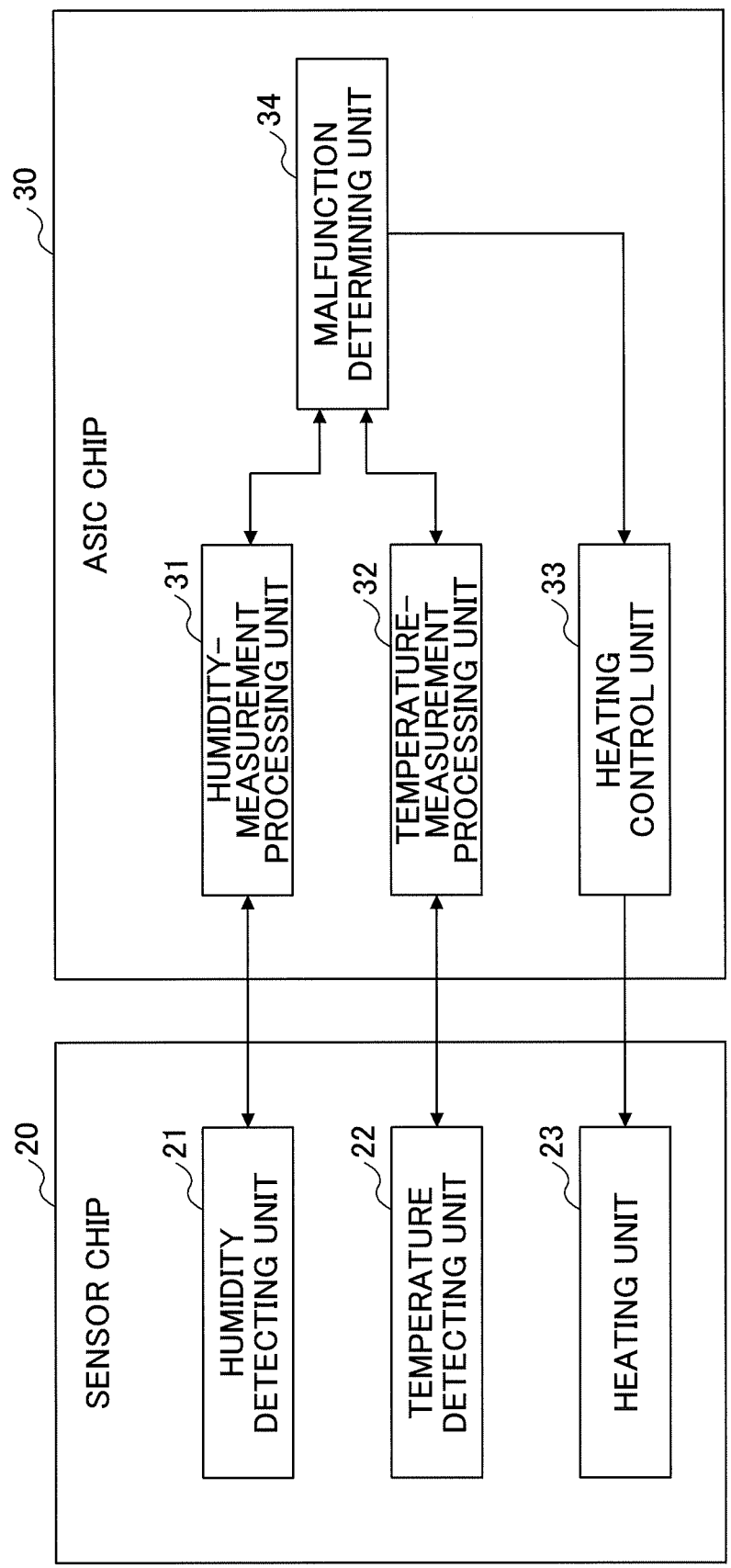
FIG. 14 is a block diagram illustrating an example of a configuration of an ASIC chip according to one embodiment.

FIG. 14 is a block diagram illustrating an example of a configuration of the ASIC chip 30. As illustrated in FIG. 14, the ASIC chip 30 includes a humidity-measurement processing unit 31, a temperature-measurement processing unit 32, a heating control unit 33, and a malfunction determining unit 34.

As described below in detail, the humidity-measurement processing unit 31 applies a first drive signal and a second drive signal, which have opposite phases, to the first drive terminal T1 and the second drive terminal T2, respectively. Further, the humidity-measurement processing unit 31 converts a charge carried from the pad 24b as the signal terminal TS, into a voltage to measure relative humidity.

The temperature-measurement processing unit 32 detects a potential at the pad 24e as the terminal for temperature detection HT, and calculates temperature corresponding to the detected potential.

The heating control unit 33 applies a predetermined drive voltage (e.g., the above power supply voltage VDD) to the pad 24f as the terminal for heating, and causes the heating unit 23 to which a current (e.g., about 10 mA) flows to produce heat. The heating control unit 33 controls an amount of produced heat, by controlling a voltage applied to the pad 24f.

The malfunction determining unit 34 determines whether the humidity detecting device 10 malfunctions based on relative humidity measured by the humidity-measurement processing unit 31 and temperature measured by the temperature-measurement processing unit 32. In determination of malfunction, the malfunction determining unit 34 transmits, to the heating control unit 33, an instruction to start or finish heating by the heating unit 23.

For example, in an initial state where the heating unit 23 does not generate heat, the malfunction determining unit 34 acquires humidity H1 from the humidity-measurement processing unit 31, and acquires temperature T1 from the temperature-measurement processing unit 32. Next, the malfunction determining unit 34 causes the heating unit 23 to start heating. After a certain period of time, the malfunction determining unit 34 further acquires humidity H2 from the humidity-measurement processing unit 31, and acquires temperature T2 from the temperature-measurement processing unit 32.

When temperature is increased by heating (T2>T1) and humidity is decreased by heating (H2<H1), the malfunction determining unit 34 determines that the humidity detecting device 10 is in a normal state, and otherwise determines that the humidity detecting device 10 malfunctions.

[Configuration of Humidity-Measurement Processing Unit]

Hereafter, a configuration of the humidity-measurement processing unit 31 will be described.

Figure 15:
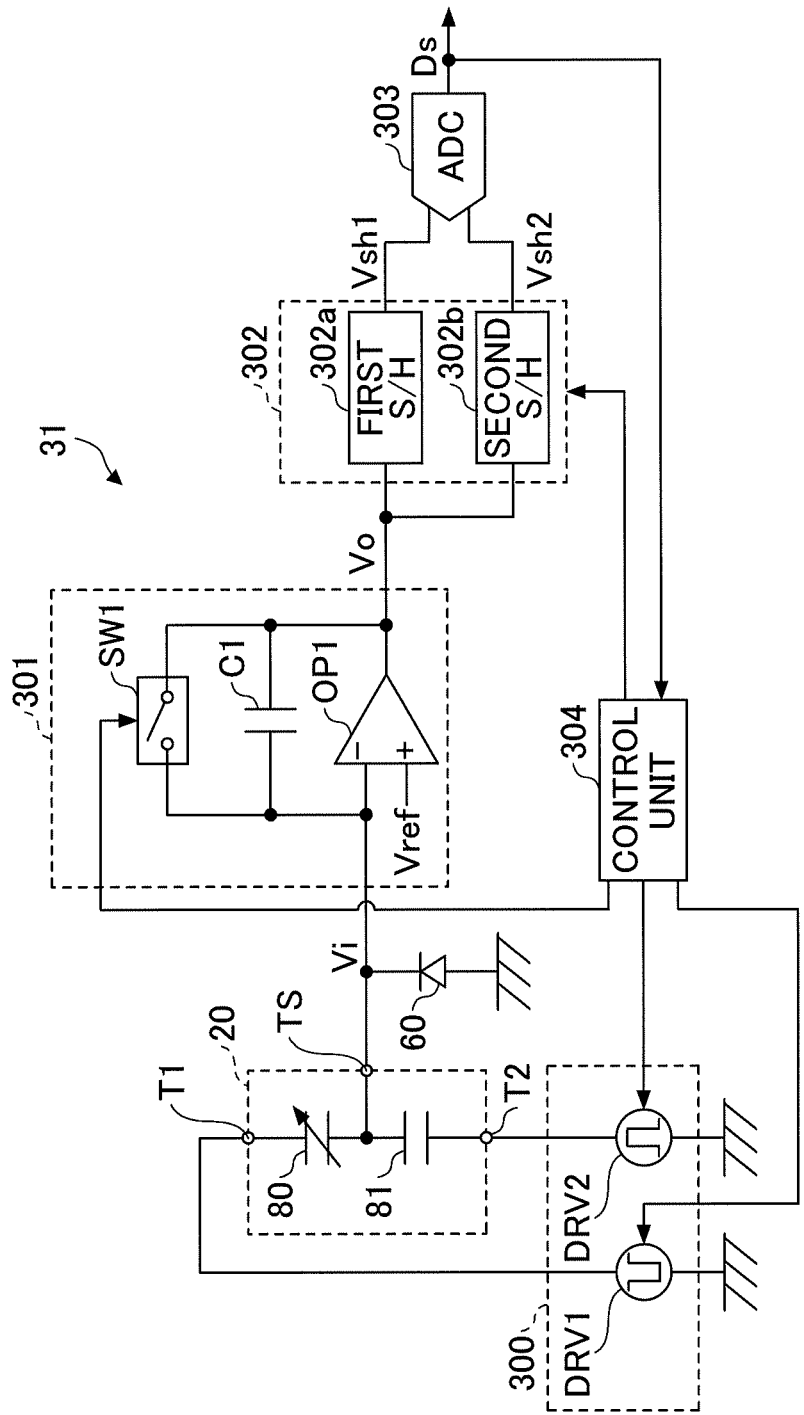
FIG. 15 is a diagram illustrating an example of a configuration of a humidity-measurement processing unit according to one embodiment.

FIG. 15 is a diagram illustrating an example of a configuration of the humidity-measurement processing unit 31. As illustrated in FIG. 15, the humidity-measurement processing unit 31 includes a drive unit 300, a charge amplifier 301, a sample and hold circuit 302, an AD (analog to digital) converter (ADC) 303, and a control unit 304. Note that in FIG. 15, a given ESD protection circuit 60 connected to the pad 24b as the signal terminal TS of the sensor chip 20 is illustrated.

The drive unit 300 includes a first drive circuit DRV1 and a second drive circuit DRV2. The charge amplifier 301 is a switched capacitor type circuit for converting a charge into a voltage (CV conversion), which includes a capacitor C1, an operational amplifier OP1, and a switch circuit SW1.

The first drive circuit DRV1 applies a first drive signal, which is an alternating current (AC) drive signal as a square wave, to the first drive terminal T1 of the sensor chip 20, under control of the control unit 304. The second drive circuit DRV2 applies a second drive signal to the second drive terminal T2 of the sensor chip 20, under control of the control unit 304. The second drive signal is an AC drive signal as a square wave, and has an opposite phase of the first drive signal. When the first drive signal reaches a high level, the second drive signal falls to a low level, and when the first drive signal falls to a low level, the second drive signal reaches a high level.

For example, each of the first drive signal and the second drive signal reaches a same high level as the power supply voltage VDD, and falls to a same low level as the ground potential GND.

One end of the capacitor C1 is connected to the signal terminal TS of the sensor chip 20, and another end of the capacitor C1 is connected to the output of the operational amplifier OP1.

A reverse input terminal of the operational amplifier OP1 is connected to the signal terminal TS, and a reference voltage Vref is inputted to a non-reverse input terminal of the operational amplifier OP1. For example, the reference voltage Vref is taken as a value intermediate between a high level and a low level, with respect to a first drive signal and a second drive signal.

Because the voltage gain of the operational amplifier OP1 is very high, a voltage at the signal terminal TS is approximately same as the reference voltage Vref. Further, because an input impedance of the reverse input terminal of the operational amplifier OP1 is very high, almost no current flows into the reverse input terminal. The operational amplifier OP1 applies a voltage Vo that expresses an increased difference between a voltage at the signal terminal TS and a reference voltage Vref.

The switch circuit SW1 is a circuit for discharging an electric charge stored by the capacitor C1, and is connected in parallel with the capacitor C1. The switch circuit SW1 is turned on or off under control of the control unit 304.

The sample and hold circuit 302 includes a first sample and hold circuit (first S/H) 302a and a second sample and hold circuit (second S/H) 302b. The first S/H 302a and the second S/H 302b are connected in parallel between the drive unit 300 and the ADC 303. Under control of the control unit 304, each of the first S/H 302a and the second S/H 302b selectively samples and holds the output voltage Vo from the charge amplifier 301 to supply the held voltage.

The ADC 303 is an AD converter of the differential input type, in which one of two input terminals is connected to an output terminal of the first S/H 302a and another is connected to an output terminal of the second S/H 302b. The ADC 303 converts a difference $\Delta V$ between an output voltage Vsh1 of the first S/H 302a and an output voltage Vsh2 of the second S/H 302b, into a digital signal Ds to output the digital signal. In the present embodiment, the ADC 303 serves as a differential processing unit.

The control unit 304 controls each unit in the ASIC chip 30. The control unit 304 follows a predetermined measurement sequence to: cause the drive unit 300 to generate a drive signal; cause the discharge from the capacitor C1 by the switch circuit SW1; cause the sample and hold circuit 302 to perform a sample-and-hold operation; and cause the ADC 303 to perform analog-to-digital conversion.

[Measurement Sequence]

Hereafter, a measurement sequence will be described.

Figure 16:
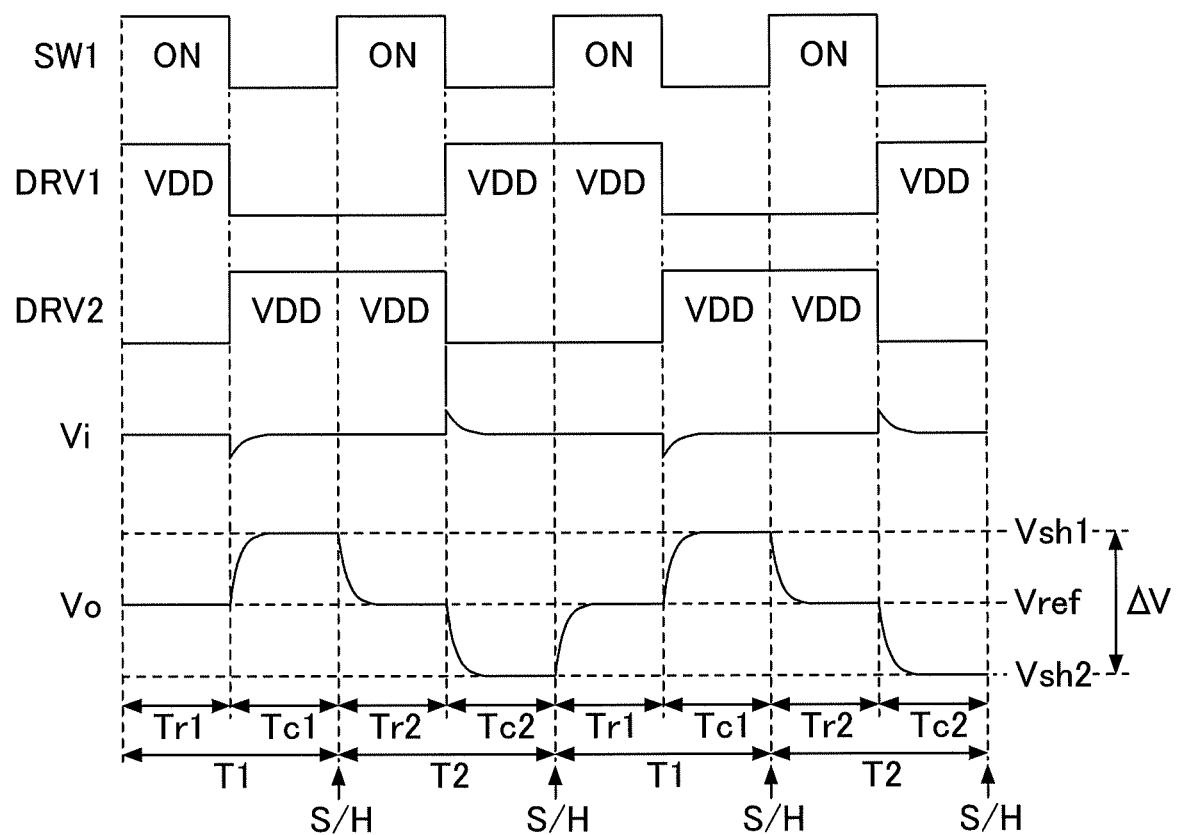
FIG. 16 is a timing chart for explaining a measurement sequence according to one embodiment.

FIG. 16 is a timing chart for explaining an example of the measurement sequence. In the measurement sequence, the control unit 304 controls each unit such that a first period T1 and a second period T2 are repeatedly set. The first period T1 includes a first reset period Tr1 and a first charge-transfer period Tc1. The second period T2 includes a second reset period Tr2 and a second charge-transfer period Tc2.

Each of the first reset period Tr1 and the second reset period Tr2 is a period during which the switch circuit SW1 is turned on to discharge an electric charge from the capacitor C1. Each of the first charge-transfer period Tc1 and the second charge-transfer period Tc2 is a period during which the switch circuit SW1 is turned off to cause the capacitor C1 to be rechargeable, so that an electric charge carried from the signal terminal TS of the sensor chip 20 is transmitted to the capacitor C1.

In the first reset period Tr1, a first drive signal is set at a high level, and a second drive signal is set at a low level. In the first charge-transfer period Tc1, the first drive-signal is set at a low level, and the second drive-signal is set at a high level. In the second reset period Tr2, the first drive signal is set at a low level, and the second drive signal is set at a high level. In the second charge-transfer period Tc2, the first drive signal is set at a high level, and the second drive signal is set at a low level. In such a manner, a voltage of each of the first drive signal and the second drive signal is alternately inverted between the first period T1 and the second period T2. In other words, the first drive signal and the second drive signal have opposite phases. Note that the inverted voltage means that a voltage is inverted with respect to the reference voltage Vref.

Thereby, an output voltage Vo from the operation amplifier OP1 is inverted between the first charge-transfer period Tc1 and the second charge-transfer period Tc2. An output voltage Vo (first output voltage) in the first charge-transfer period Tc1 is sampled and held by the first S/H 302a. An output voltage Vo (second output voltage) in the second charge-transfer period Tc2 is sampled and held by the second S/H 302b.

Each period will be described below in detail. First, in the first reset period Tr1, the switch circuit SW1 is turned on, so that the capacitor C1 discharges an electric charge and the operational amplifier OP1 is virtually shorted. In this case, a first drive signal at a high level (VDD) is applied to the first drive terminal T1, and a second drive signal at a low level (GND) is applied to the second drive terminal T1. Thereby, an electric charge is stored by each of the capacitor 80 for humidity detection and the capacitor 81 for reference of the sensor chip 20, relative to a reference voltage Vref. A total charge Q1 stored by those capacitors is expressed by Equation (1) below.

$$Q1 = -Cs \times (VDD - Vref) + Cr \times Vref \tag{1}$$

Where Cs denotes capacitance of the capacitor 80 for humidity detection, and Cr denotes capacitance of the reference capacitor 81.

The switch circuit SW1 is turned on in the first reset period Tr1, so that a charge Q2 stored by the capacitor C1 indicates 0.

Next, in the first charge-transfer period Tc1, the switch circuit SW1 is turned off, so that the first drive signal is changed to a low level (GND) and the second drive signal is changed to a high level (VDD). The switch circuit SW1 is turned off and then the inverting input terminal of the operational amplifier OP1 is in a state of holding a high impedance (HiZ). Accordingly, a total charge amount with respect to the capacitor 80 for humidity detection, the capacitor 81 for reference, and the capacitor C1, is maintained at a constant level based on the principle of charge conservation.

A voltage Vi supplied from the inverting input terminal of the operational amplifier OP1 varies in response to variations in the voltages of the first drive signal and the second drive signal. Subsequently, an output voltage Vo increases until a differential input voltage is balanced by a feedback through the operational amplifier OP1.

In this case, a total charge Q3 stored by the capacitor 80 for humidity detection and the capacitor 81 for reference is expressed by Equation (2) below.

$$Q3 = -Cr \times (VDD - Vref) + Cs \times Vref \tag{2}$$

In the first charge-transfer period Tc1, a charge Q4 stored by the capacitor C1 is expressed by Equation (3) below.

$$Q4 = C1 \times (Vref - Vo) \tag{3}$$

Because a relationship indicated by "Q1+Q2=Q3+Q4" is achieved based on the principle of charge conservation, an output voltage Vo in the first charge-transfer period Tc1 is expressed by Equation (4) below.

$$Vo = VDD \times (Cs - Cr)/C1 + Vref \tag{4}$$

In a sample-and-hold operation by the first S/H 302*a*, at an end point of the first charge-transfer period Tc1 in which the output voltage Vo is sufficiently increased, a signal is captured. In this case, the output voltage Vo expressed by Equation (4) above is held by the first S/H 302*a*.

A process during the second reset period Tr2 is same as that during the first reset period Tr1, except that each of the voltages of the first drive signal and the second drive signal is inverted. In such a manner, in the second reset period Tr2, a total charge Q11 stored by the capacitor 80 for humidity detection and the capacitor 81 for reference is expressed by Equation (5) below.

$$Q11 = -Cr \times (VDD - Vref) + Cs \times Vref \quad (5)$$

A charge Q21 stored by the capacitor C1 is 0.

Similarly, in the second charge-transfer period Tc2, each of the voltages of the first drive signal and the second drive signal is inverted. In such a manner, in the second charge-transfer period Tc2, a total charge Q31 stored by the capacitor 80 for humidity detection and the capacitor 81 for reference is expressed by Equation (6) below.

$$Q31 = -Cs \times (VDD - Vref) + Cr \times Vref \quad (6)$$

A charge Q41 stored by the capacitor C1 in the second charge-transfer period Tc2 is same as that expressed by Equation (3) above.

Because a relationship indicated by "Q11+Q21=Q31+Q41" is achieved based on the principle of charge conservation, an output voltage Vo in the second charge-transfer period Tc2 is expressed by Equation (7) below.

$$Vo = -VDD \times (Cs - Cr)/C1 + Vref \quad (7)$$

In a sample-and-hold operation by the second S/H 302*b*, at an end point of the second charge-transfer period Tc2 in which the output voltage Vo is sufficiently increased, a signal is captured. In this case, the output voltage Vo expressed by Equation (7) is held by the second S/H 302*b*.

Each of the first S/H 302*a* and the second S/H 302*b* maintains a currently held voltage until the next sample-and-hold operation starts. In the present embodiment, an output voltage Vsh1 matching the output voltage Vo expressed by Equation (4) above and an output voltage Vsh2 matching the output voltage Vo expressed by Equation (7) above are outputted to the ADC 303.

A difference ΔV obtained by the ADC 303 as a difference processing unit is expressed by Equation (8) below.

$$\Delta V = 2 \times VDD \times (Cs - Cr)/C1 \quad (8)$$

As described above, each of the voltages of the first drive signal and the second drive signal is inverted between the first period T1 and the second period T2, so that the amplitude of a measured signal can be doubled.

[Effect of Cancelling Leakage Current]

Figure 17:
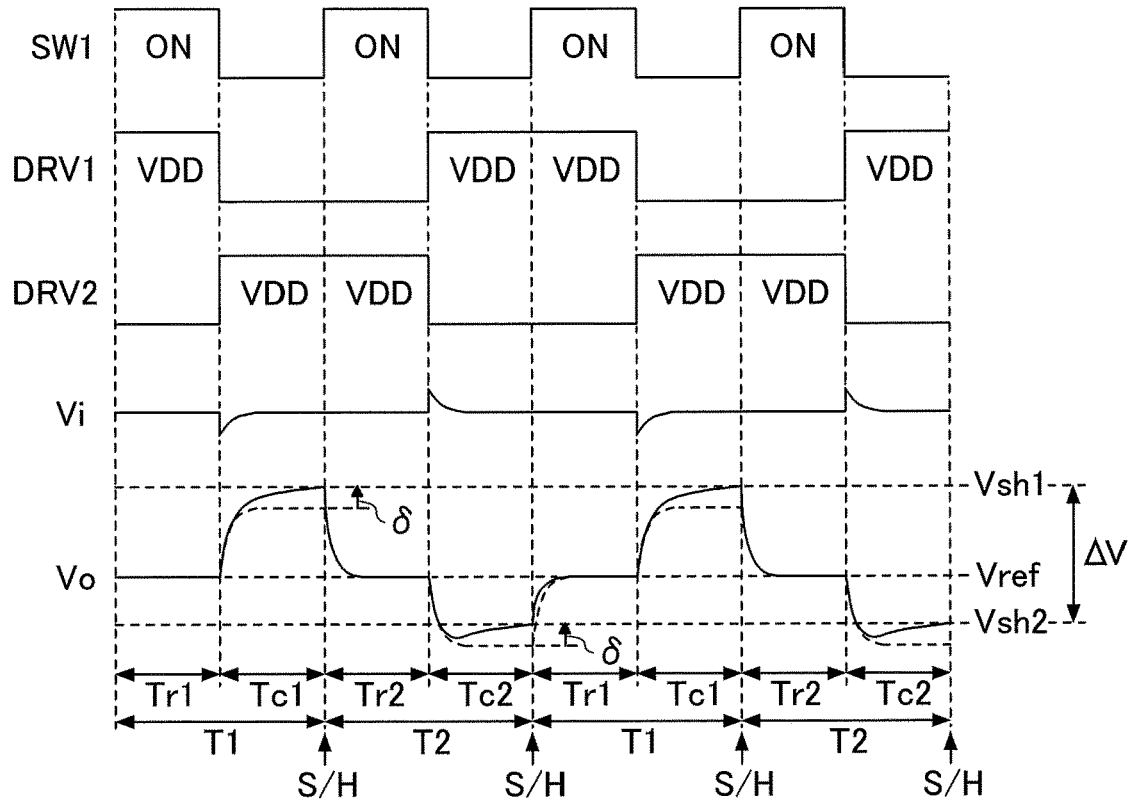
FIG. 17 is a diagram for explaining an example of an effect of cancelling a leak current according to one embodiment.

FIG. 17 is a diagram for explaining an effect of cancelling a leakage current. In the present embodiment, a given ESD protection circuit 60 is connected to the signal terminal TS of the sensor chip 20. In this case, a reverse voltage is applied to a p-n junction in the ESD protection circuit 60, and thus a reverse current (leak current) may flow. Further, with respect to each of the switch circuit SW1 included in the operational amplifier OP1 and a switch circuit (not shown) connected to the signal terminal TS, a reverse voltage is also applied to a given p-n junction, and thus a reverse current (leak current) may flow.

In a first charge-transfer period Tc1 and a second charge-transfer period Tc2 in each of which the switch circuit SW1 is in an off state, such a leakage current flows through a pathway that includes an output terminal of the charge amplifier 301, the capacitor C1, an input terminal of the charge amplifier 301, the ESD protection circuit 60, and the ground, for example. When the leak current flows through the switch circuit SW1, an output voltage Vo varies accordingly. A variation δ in the output voltage Vo is expressed by Equation (9) below.

$$\delta = I \times t / C1 \quad (9)$$

Where I denotes the magnitude of the leakage current, and t denotes length of each of the first charge-transfer period Tc1 and the second charge-transfer period Tc2.

Note that if the leakage current flows from the input terminal of the charge amplifier 301 to the ground, as described above using the pathway, the variation δ becomes positive, which results in the increase in the output voltage Vo. In contrast, if the leakage current flows from a location charged at a high voltage such as the VDD to the input terminal of the charge amplifier 301, the variation δ becomes negative, which results in the decrease in the output voltage Vo.

The leakage current flows through a same pathway during the first charge-transfer period Tc1 and the second charge-transfer period Tc2. For this reason, positive or negative variation δ is determined regardless of whether the first charge-transfer period Tc1 or the second charge-transfer period Tc2 is set.

As illustrated in FIG. 17, when a leakage current flows, the variation δ in the output voltage Vo during the first charge-transfer period Tc1 has a same polarity as in the second charge-transfer period Tc2. Thereby, a given leakage current is canceled by a differential process through the ADC 303. Accordingly, errors in a given output voltage from the charge amplifier 301 due to the leakage current are suppressed.

Note that in the measurement sequences illustrated in FIGS. 16 and 17, with respect to each of the first drive signal and the second drive signal, the high level of voltage can be set as a low level and the low level of voltage can be set as a high level.

[Effect of Reducing Power Consumption]

Hereafter, an effect of reducing power consumption due to a laminated electrode structure as illustrated in FIGS. 9 and 13, will be described.

Figure 18:
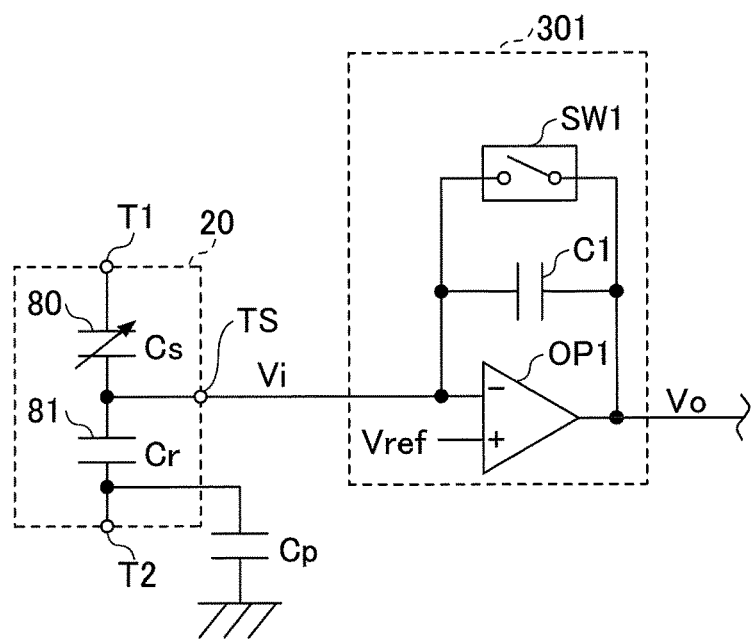
FIG. 18 is a diagram illustrating an example of an equivalent circuit of an electrode structure including parasitic capacitance according to one embodiment.

FIG. 18 is a diagram illustrating an equivalent circuit of an electrode structure including parasitic capacitance. As illustrated in FIGS. 9 and 13, in the present embodiment, the reference electrode 82 is disposed in proximity to the p-type semiconductor substrate 70. For this reason, parasitic capacitance Cp occurs between the reference electrode 82 and the p-type semiconductor substrate 70. The parasitic capacitance Cp is additionally illustrated between the reference capacitor 81 and the second drive terminal T2, as illustrated in FIG. 18.

Figure 19:
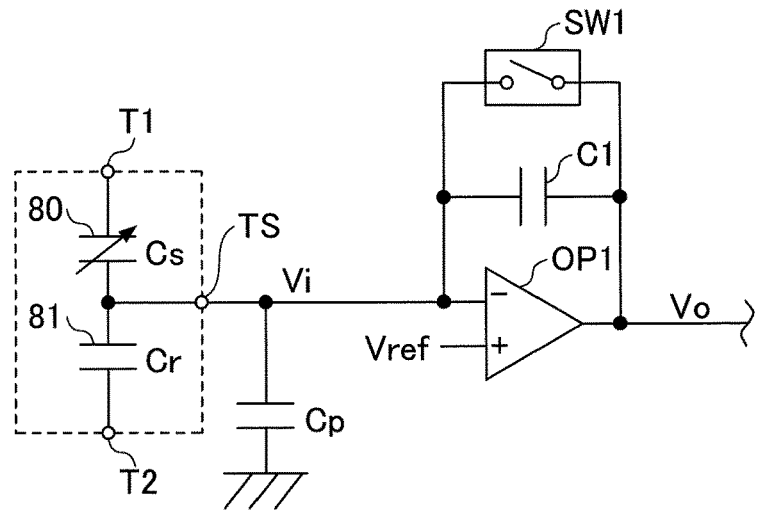
FIG. 19 is a diagram illustrating an equivalent circuit of an electrode structure known to the inventors.

FIG. 19 is a diagram illustrating an equivalent circuit of an electrode structure used as a comparative example of the present embodiment. For example, as illustrated in FIG. 4 in Patent Document 1, a lower electrode as a capacitance detecting electrode is disposed on a substrate, in proximity to the substrate. In such a manner, parasitic capacitance Cp occurs between the lower electrode and the substrate. This parasitic capacitance Cp is associated with a signal terminal TS, as illustrated in FIG. 19.

As described above, in the present embodiment, the parasitic capacitance Cp provided between the reference electrode 82 and the substrate is associated with the capacitor 81 for reference, without being associated with the signal terminal TS. Thereby, a load of driving the charge amplifier whose input terminal is connected to the signal terminal TS is decreased, so that the power consumption is reduced.

[Effect Due to Pad Arrangement]

Hereafter, an effect due to pad arrangement will be described according to the present embodiment.

Figure 20:
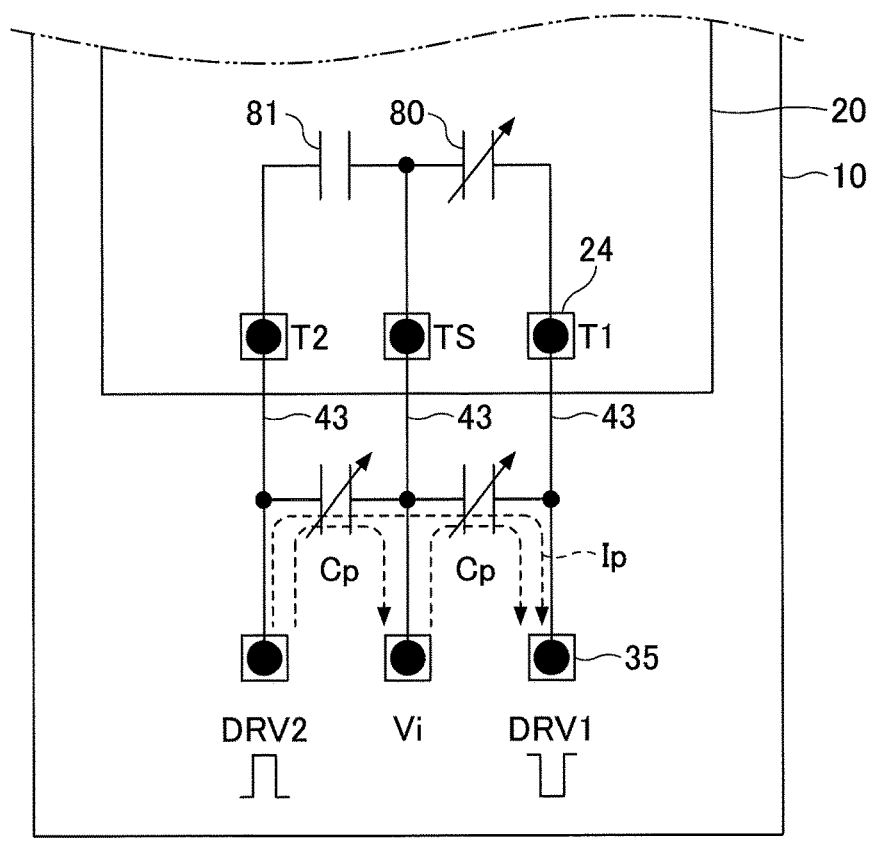
FIG. 20 is a diagram for explaining an effect due to a pad layout according to one embodiment.

FIG. 20 is a diagram for explaining an effect due to pad arrangement according to the present embodiment. As illustrated in FIG. 20, in the present embodiment, pads 24 of the sensor chip 20 are arranged such that the first drive terminal T1 and the second drive terminal T2 are symmetric about the signal terminal TS. Similarly, first pads 35 of the ASIC chip 30 are arranged such that an output terminal from which a first drive signal is outputted and an output terminal from which a second drive signal is outputted are symmetric about the input terminal of the charge amplifier 301.

In such a manner, first bonding wires 43 that are respectively connected to the signal terminal TS, the first drive terminal T1, and the second drive terminal T2, are disposed so as to be nearly symmetric. In this case, each parasitic capacitance Cp occurs between given two first bonding wires 43. The parasitic capacitance Cp may vary in response to variation in moisture absorbed by the mold resin 40.

If a current associated with given parasitic capacitance Cp flows to the input terminal of the charge amplifier 301, the time constant of a given signal would negatively vary, or the like. However, in the present embodiment, the symmetric arrangement of pads is achieved such that: each parasitic capacitance Cp is approximately equal in magnitude; and a voltage of the second drive signal is an inverted voltage with respect to a voltage of the first drive signal. Thereby, a first current flowing into the input terminal of the charge amplifier 301, as well as a second current flowing from the input terminal of the charge amplifier 301, are simultaneously caused. In this case, because the first current and the second current are approximately equal in magnitude, they are cancelled. As a result, only a current flow indicated by Ip in FIG. 20 is achieved, and thus a current flowing to the input terminal of the charge amplifier 301 is suppressed. Accordingly, a negatively changed time constant or the like is avoided.

As expressed by Equation (8) above, the humidity-measurement processing unit 31 measures humidity corresponding to a value proportional to a difference between the capacitance Cs of the capacitor 80 for humidity detection and the capacitance Cr of the capacitor 81 for reference. In such a manner, when parasitic capacitances Cp occurs as illustrated in FIG. 20, the humidity is measured so as to be responsive to a difference between "Cs+Cp" and "Cr+Cp", and thus the parasitic capacitances Cp are canceled. Accordingly, the pad arrangement illustrated in FIG. 20 avoids reductions in the measurement accuracy due to the parasitic capacitances Cp.

Note that the signal terminal TS and the first drive terminal T1 may not be adjacently disposed, as with the signal terminal TS and second drive terminal T2. As illustrated in the example of FIG. 4, another terminal (a given pad 24) may be disposed between the signal terminal TS and either of the first drive terminal T1 or the second drive terminal T2. In FIG. 4, the terminal for temperature detection TMP is disposed between the signal terminal TS and the first drive terminal T1, and the ground electrode terminal GND is disposed between the signal terminal TS and the second drive terminal T2. In this case, because each of these terminals TMP and GND has an approximately constant potential, each parasitic capacitance Cp is maintained to be approximately equal in magnitude.

[Variations of Shield Layer]

Hereafter, modifications of a shielding layer will be described.

In FIG. 12, in the surroundings of the lower electrode 83, the ground interconnect 107 disposed in proximity to the lower electrode 83 serves as the shield layer. However, in the following variations, one or more shield layers are individually provided in the surroundings of the lower electrode 83.

Figure 21:
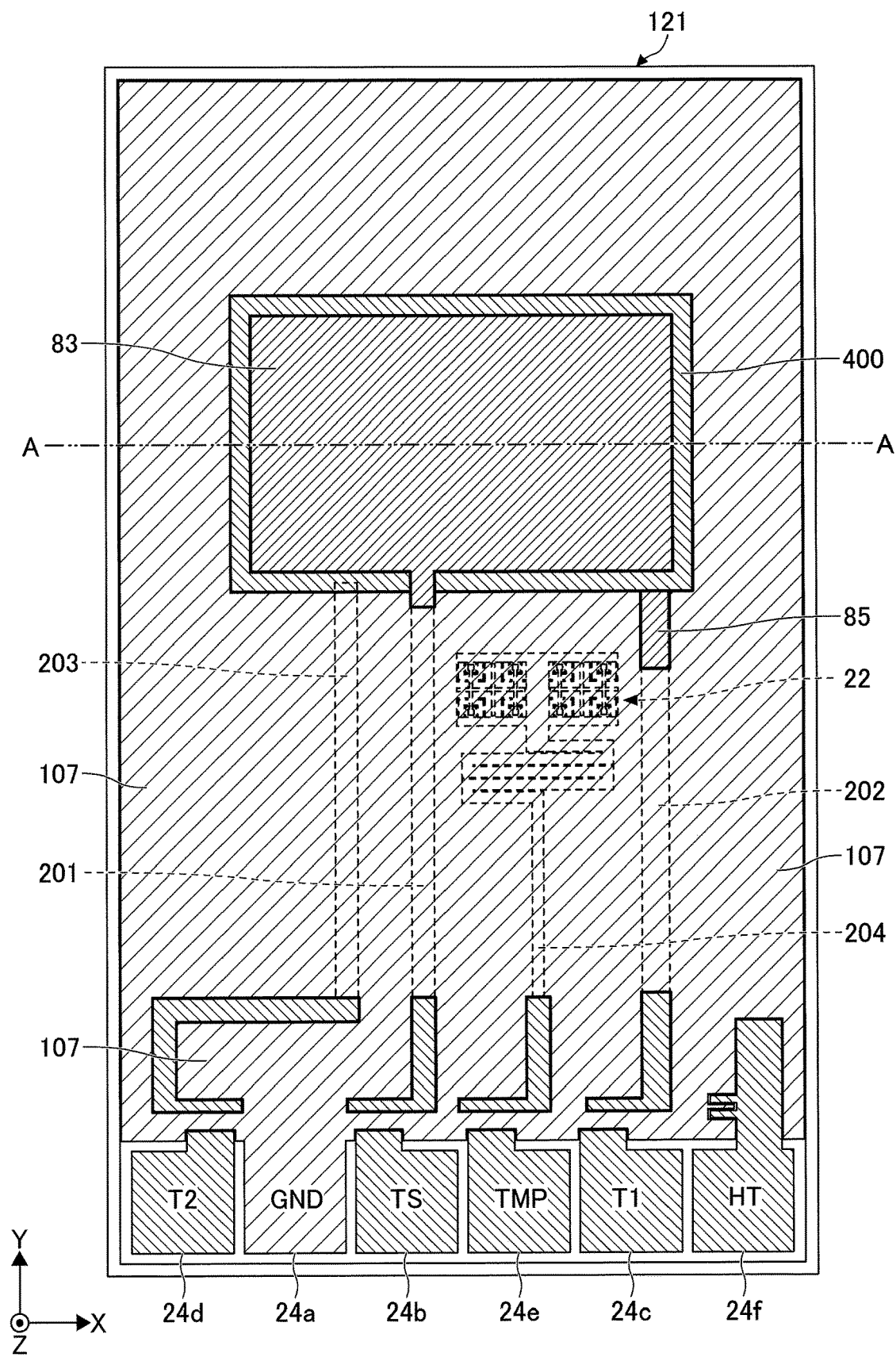
FIG. 21 is a plan view of a shield layer in first modification.

FIG. 21 is a plan view of an example of a shield layer in first modification. As illustrated in FIG. 21, in the first variation, a shielding layer 400 is formed so as to surround the perimeter of a lower electrode 83. The shielding layer 400 preferably has a constant potential (e.g., a power supply voltage VDD or a ground potential GND). The shielding layer 400 may be configured to have a constant potential in accordance with a first drive signal or a second drive signal.

Figure 22:
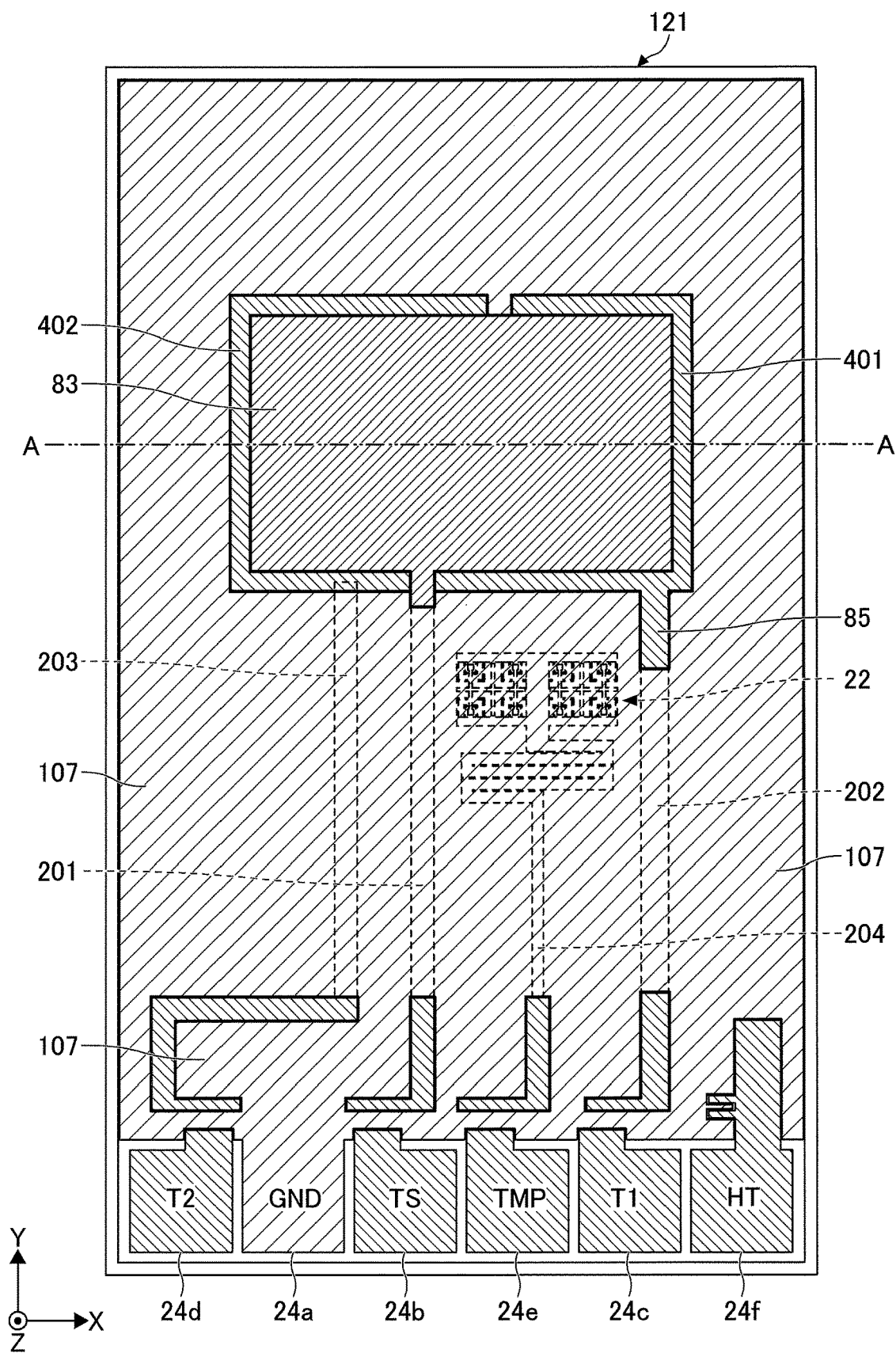
FIG. 22 is a plan view of a shield layer in second modification.

FIG. 22 is a plan view of an example of a shield layer in second modification. As illustrated in FIG. 22, in the second variation, a first shielding layer 401 and a second shielding layer 402 are formed so as to surround the perimeter of a lower electrode 83.

The first shielding layer 401 surrounds a portion (approximately half) of the lower electrode 83, and the second shielding layer 402 surrounds another portion (approximately half) of the lower electrode 83. The first shielding layer 401 and the second shielding layer 402 are approximately equal in length, width, thickness, and distance from the lower electrode 83. In such a manner, parasitic capacitance provided between the first shielding layer 401 and the lower electrode 83 is approximately equal to parasitic capacitance provided between the second shielding layer 402 and the lower electrode 83.

The first shielding layer 401 is connected to a signal line 202, and a first drive signal is applied to the first shielding layer 401. The second shielding layer 402 is connected to a signal line 203, and a second drive signal is applied to the second shielding layer 402.

When the first drive signal and the second drive signal are applied to the first shielding layer 401 and the second shielding layer 402, respectively, there may be variation in the absolute value of capacitance of the capacitor 80 for humidity detection and the capacitor 81 for reference. However, because the above variation indicates a predictable value, the variation is able to be cancelled by correcting a given output voltage Vo, or the like.

Note that a shielding layer surrounding the periphery of the lower electrode 83 may be divided into three or more separate layers.

[Modifications of Humidity-Measurement Processing Unit]

Hereafter, modifications of the humidity-measurement processing unit will be described.

Figure 23:
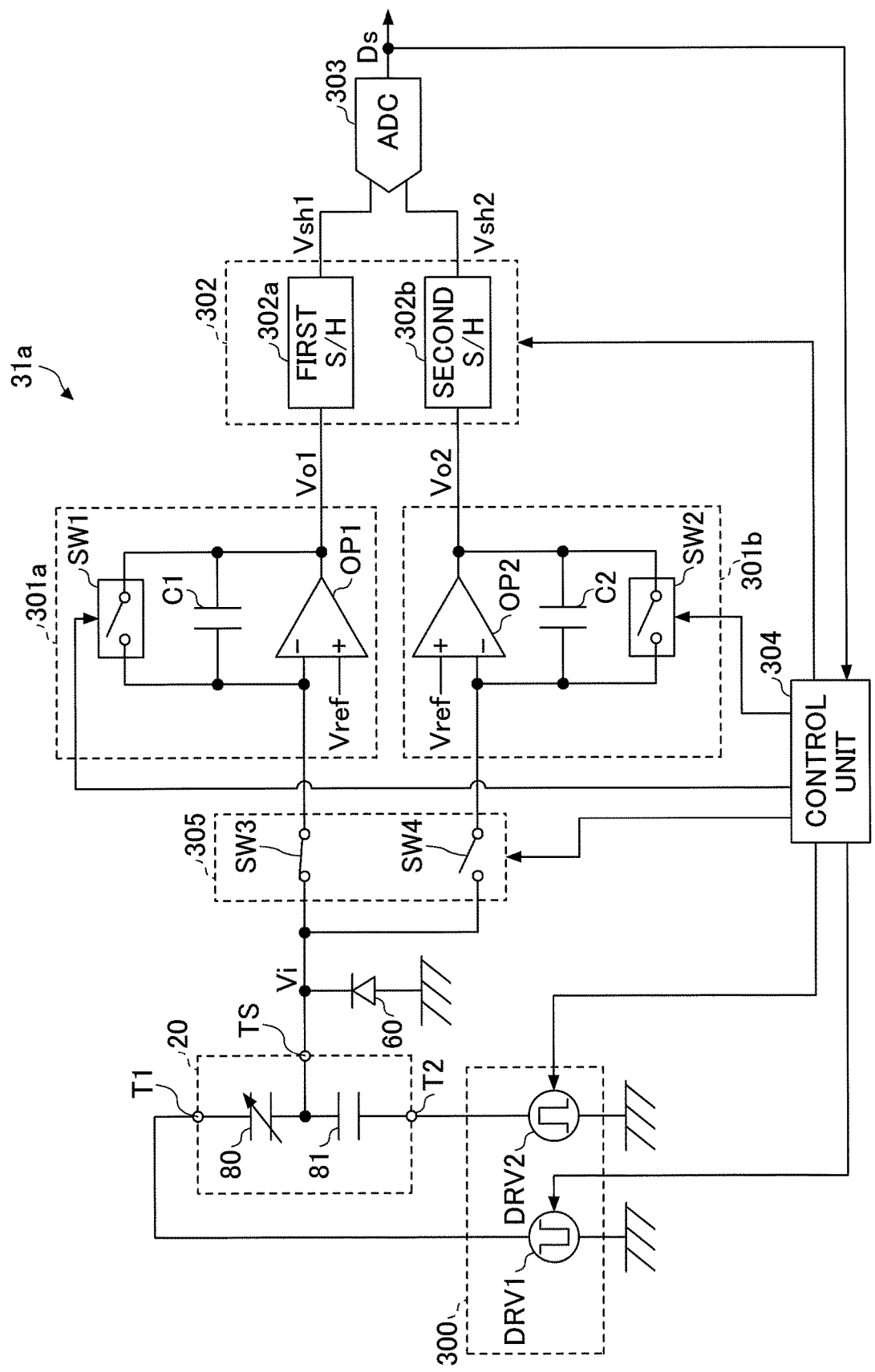
FIG. 23 is a diagram illustrating an example of a configuration of a humidity-measurement processing unit in modification.

FIG. 23 is a diagram illustrating an example of a configuration of a humidity-measurement processing unit 31a in modification. As illustrated in FIG. 23, the humidity-measurement processing unit 31a in the modification differs from the humidity-measurement processing unit 31 according to the above embodiment, in that a first charge amplifier 301a, a second charge amplifier 301b, and a demultiplexer (DEMUX) 305 are included in the humidity-measurement processing unit 31a.

Each of the first charge amplifier 301a and the second charge amplifier 301b has a same configuration as the charge amplifier 301 according to the above embodiment.

A first S/H 302a is connected to an output terminal of the first charge amplifier 301a, and a second S/H 302b is connected to an output terminal of the second charge amplifier 301b. The DEMUX 305 is connected to an input terminal of each of the first charge amplifier 301a and the second charge amplifier 301b. The DEMUX 305 is connected to a signal terminal TS of a sensor chip 20. The DEMUX 305 includes a switch circuit SW3 and a switch circuit SW4. The signal terminal TS is connected to the first charge amplifier 301a via the switch circuit SW3. The signal terminal TS is connected to the second charge amplifier 301b via the switch circuit SW4.

The DEMUX 305 selectively connects, to the signal terminal TS, either of the first charge amplifier 301a or the second charge amplifier 301b under control of the control unit 304. Specifically, in the first period T1 described above, the DEMUX 305 turns on the switch circuit SW3, so that the first charge amplifier 301a is connected to the signal terminal TS. In the second period T2 described above, the DEMUX 305 turns on the switch circuit SW4, so that the second charge amplifier 301b is connected to the signal terminal TS.

In the modification, in the first period T1, the humidity-measurement processing unit 31a performs CV (charge to voltage) conversion through the first charge amplifier 301a; subsequently, the humidity-measurement processing unit 31a samples and holds a converted voltage through the first S/H 302a. In the second period T2, the humidity-measurement processing unit 31a performs CV (charge to voltage) conversion through the second charge amplifier 301b; subsequently, the humidity-measurement processing unit 31a samples and holds a converted voltage through the second S/H 302b.

Other configuration and operation of the humidity-measurement processing unit 31a are same as the humidity-measurement processing unit 31 according to the above embodiment.

Figure 24:
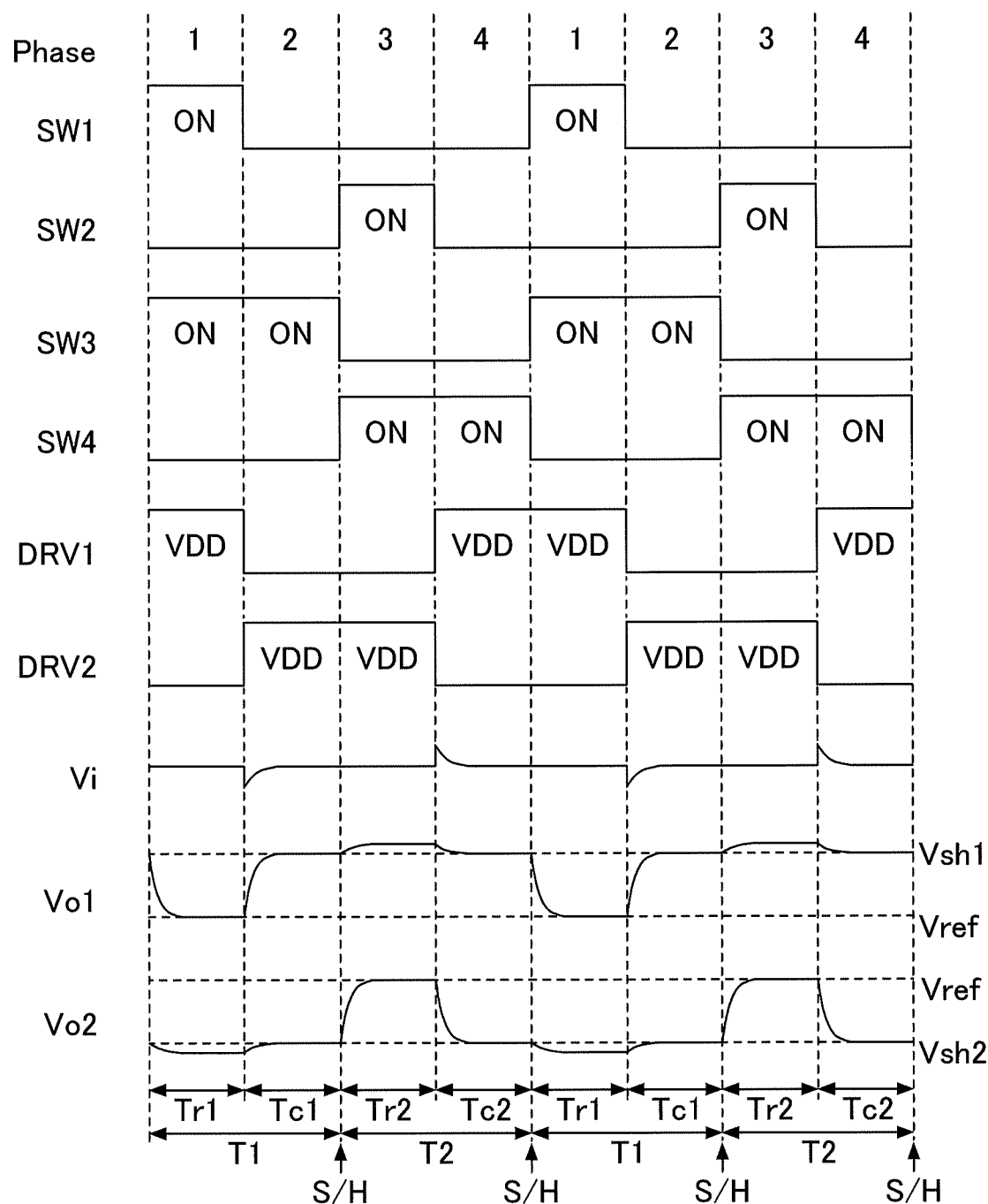
FIG. 24 is a timing chart for explaining an example of a measurement sequence of the humidity-measurement processing unit in the modification.

FIG. 24 is a timing chart for explaining an example of a measurement sequence of the humidity-measurement processing unit 31a in the modification. In FIG. 24, Vo1 denotes an output voltage (hereinafter referred to as a first output voltage) from the first charge amplifier 301a. Vo2 denotes an output voltage (hereinafter referred to as a second output voltage) from the second charge amplifier 301b.

In the modification, the first charge amplifier 301a is driven during a first period T1, and the second charge amplifier 301b is driven during a second period T2. In other words, the first charge amplifier 301a and the second charge amplifier 301b are driven with different timings. In the modification, a first output voltage Vo1 is increased from a reference voltage Vref in a first charge-transfer period Tc1 (Phase 2) of the first period T1. Subsequently, a second output voltage Vo2 is decreased from the reference voltage Vref in a second charge-transfer period Tc2 (Phase 4) of the second period T2.

Ideally, the second output voltage Vo2 should be maintained at an output voltage Vsh2 in a first reset period Tr1 (Phase 1), and the first output voltage Vo1 should be maintained at an output voltage Vsh1 in a second reset period Tr2 (Phase 3).

In order to increase the accuracy in the humidity measurement, it is preferable that a capacitance value of the first capacitor C1 included in the first charge amplifier 301a be same as that of the second capacitor C2 included the second charge amplifier 301b. In order to equalize capacitance values with respect to a first capacitor C1 and a second capacitor C2, it is preferable that both of the first capacitor C1 and the second capacitor C2 be disposed in proximity to each other, in a layout (circuit layout) of an ASIC chip 30 in which the humidity-measurement processing unit 31a is formed. With the first capacitor C1 and the second capacitor C2 being disposed in proximity to each other, the influence of in-plane variation during manufacturing is reduced, thereby decreasing the difference in capacitance values.

However, when the first capacitor C1 and the second capacitor C2 are disposed in proximity to each other, coupling between the first capacitor C1 and the second capacitor C2 occurs, which may result in variation in a given output with respect to each other. Specifically, in the first reset period Tr1, a second output voltage Vo2 varies from an output voltage Vsh2. Further, in the second reset period Tr2, a first output voltage Vo1 varies from an output voltage Vsh1. Such variation in the output may result in reductions in the accuracy of humidity measurement.

As described above, with the first capacitor C1 and the second capacitor C2 being disposed in proximity to each other, they are equal in capacitance value advantageously. However, there may be variation in a given output voltage due to the coupling. A configuration for suppressing the variation in the output voltage due to the coupling will be described below.

Figure 25:
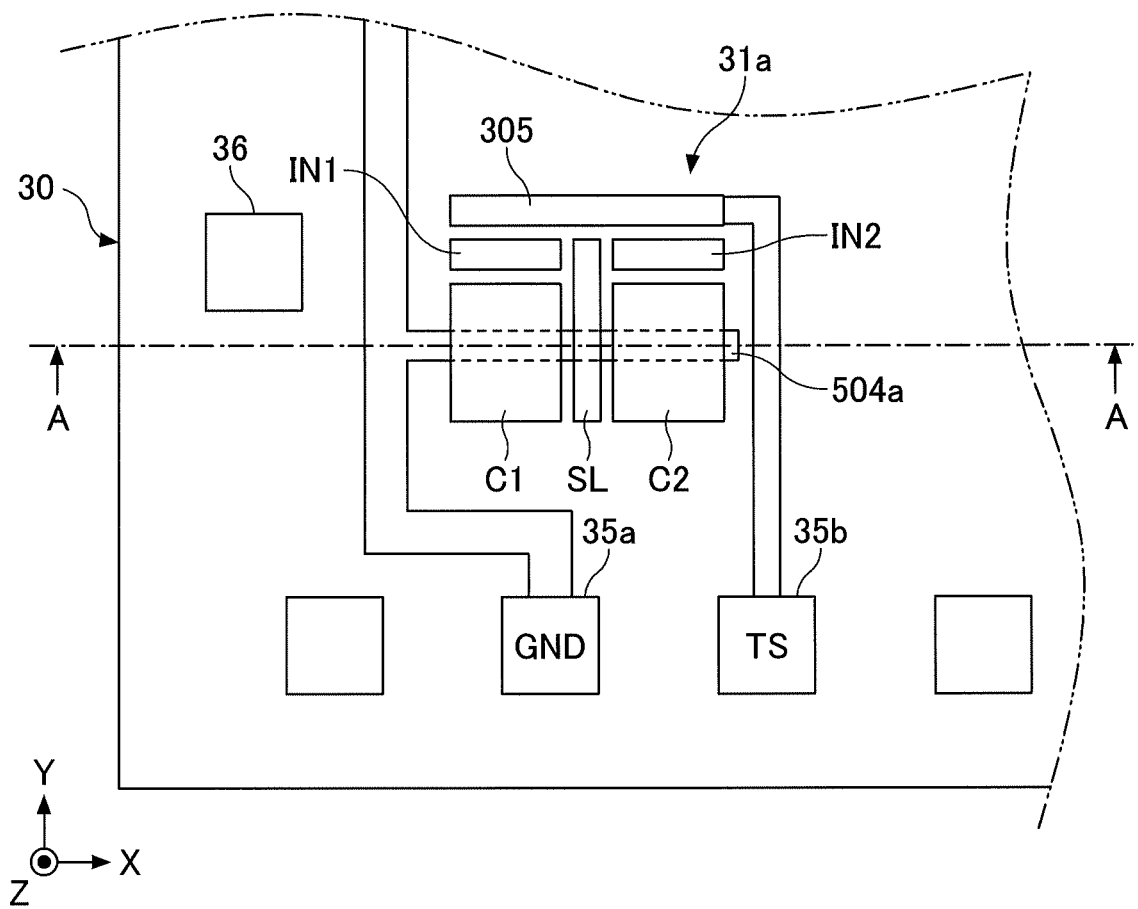
FIG. 25 is a diagram schematically illustrating an example of a layout of the humidity-measurement processing unit in an ASIC chip.

FIG. 25 is a diagram schematically illustrating a layout of the humidity-measurement processing unit 31a in an ASIC chip 30. In FIG. 25, a pad 35a is connected to a pad 24a as a ground electrode terminal (GND) of the sensor chip 20. A pad 35b is connected to a pad 24b as a signal terminal (TS) of the sensor chip 20. A pad 35b is connected to a DEMUX 305 via one or more interconnects.

The reference numeral IN1 indicates a reverse input terminal of an operational amplifier OP1 included in the first charge amplifier 301a. The reference numeral IN2 indicates a reverse input terminal of an operational amplifier OP2 included in the second charge amplifier 301b.

A first capacitor C1 and a second capacitor C2 have rectangular shapes and have a same size. The first capacitor C1 and the second capacitor C2 are adjacently disposed in an X direction. A shield interconnect SL is disposed between the first capacitor C1 and the second capacitor C2. The shielded interconnect SL extends in a Y direction. The shield interconnect SL is connected to a ground interconnect 504a connected to the pad 35a.

The first capacitor C1 and the second capacitor C2 are disposed on a side of the pad 35b with respect to inverting input terminals IN1 and IN2.

Figure 26:
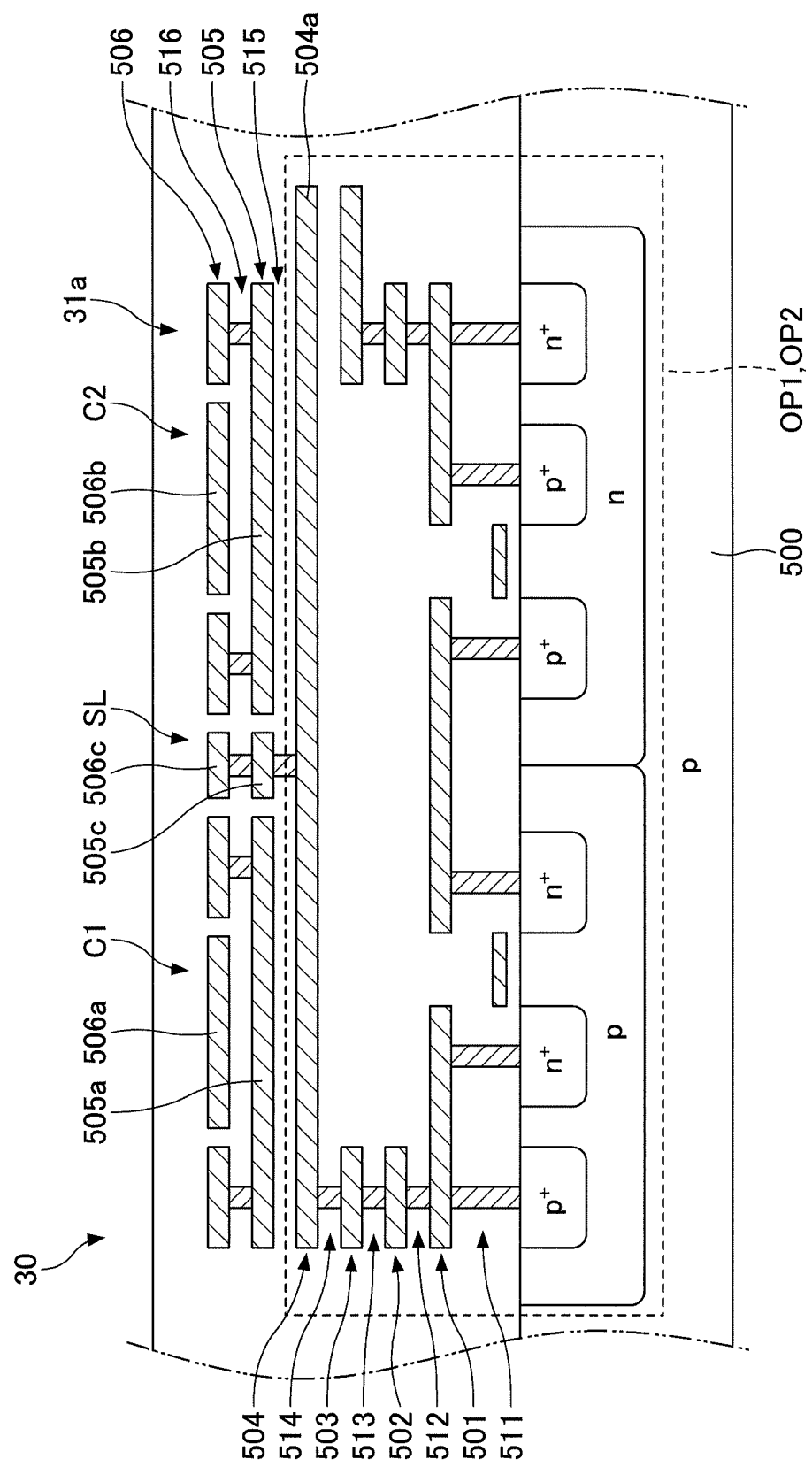
FIG. 26 is a cross-sectional view taken along the A-A line in FIG. 25.

FIG. 26 is a cross-sectional view taken along the A-A line in FIG. 25. As illustrated in FIG. 26, an ASIC chip 30 is formed using a p-type semiconductor substrate 500 as a base. First to sixth interconnect layers 501 to 506 are formed above the p-type semiconductor substrate 500. On the p-type semiconductor substrate 500, first to sixth plug layers 511 to 516 are formed for connecting the p-type semiconductor substrate 500 as well as for connecting between adjacent interconnect layers.

The operational amplifiers OP1 and OP2 include: source-drain regions formed in the p-type semiconductor substrate 500; CMOS transistors formed by gate electrodes; first to fourth interconnect layers 501 to 504; and first to fourth plug layers 511 to 514. Further, a ground interconnect 504a formed by the fourth interconnect layer 504 is disposed on the top layer of the operational amplifiers OP1 and OP2.

The first capacitor C1, the second capacitor C2, and the shield interconnect SL are located above the operational amplifiers OP1 and OP2. The first capacitor C1, the second capacitor C2, and the shield interconnect SL are configured by the fifth interconnect layer 505, the sixth interconnect layer 506, and the sixth plug layer 516.

The first capacitor C1 is a parallel-plate type capacitor that is configured by a lower electrode 505a, which is formed by the fifth interconnect layer 505, and an upper electrode 506a formed by the sixth interconnect layer 506. Similarly, the second capacitor C2 is a parallel-plate type capacitor that is configured by a lower electrode 505b, which is formed by the fifth interconnect layer 505, and an upper electrode 506b formed by the sixth interconnect layer 506.

The shield interconnect SL includes a lower interconnect 505c, which is formed by the fifth interconnect layer 505, and an upper interconnect 506c formed by the sixth interconnect layer 506. The lower interconnect 505c and the upper interconnect 506c are connected to each other via the sixth plug layer 516. The lower interconnect 505c is connected to the ground interconnect 504a via the fifth plug layer 515.

In such a manner, the shield interconnect SL includes the lower interconnect 505c and the upper interconnect 506c that are laminated via the sixth plug layer 516, and is disposed between the first capacitor C1 and the second capacitor C2. Further, a constant potential (e.g., ground potential) is supplied to the shield interconnect SL. The shield interconnect SL prevents an electrical interaction between the first capacitor C1 and the second capacitor C2, thereby blocking the coupling between those capacitors.

As described above, in the modification, the first capacitor C1 and the second capacitor C2 are disposed in proximity to each other, thereby reducing the influence of in-plane variation during manufacturing. Further, the shield interconnect SL to which a constant potential is supplied is disposed between the first capacitor C1 and the second capacitor C2. Accordingly, the variation in the output voltages due to the coupling between those capacitors can be suppressed.

Note that a potential at the shield interconnect SL is not limited to the ground potential, and may be other constant potentials.

[Other Modifications]
Other modifications will be described hereafter.

In the embodiments, the ESD protection circuit is configured by an NMOS transistor, but may be configured by a p-channel MOS transistor (PMOS transistor).

In the embodiments, the sensor chip 20 is described as using the p-type semiconductor substrate 70. However, an n-type semiconductor substrate can be used.

In the embodiments, the humidity detecting device 10 has a stack structure in which the sensor chip 20 is stacked on the ASIC chip 30. However, the present disclosure is applicable to humidity detecting devices other than the stack structure.

In the embodiments, the capacitor 80 for humidity detection and the capacitor 81 for reference are disposed. However, the capacitor 81 for reference may be removed from the detecting device. In this case, the second drive circuit DRV2 that outputs a second drive signal may not be disposed. Even in this case, in the measurement-sequence illustrated in FIG. 17, errors in a given output voltage from the charge amplifier 301 due to the leakage current can be suppressed.

In the embodiments, the humidity detecting unit 21 is a moisture sensor of the capacitance-changing type, but it may be a resistance-changing type humidity sensor such as a piezoresistive type, which detects a change in resistance of a moisture sensitive film due to absorption and dehumidification.

The embodiments are described as using the humidity detecting device 10 as an example for the detecting device. However, the present disclosure can also be applied to a detecting device that detects physical characteristics other than humidity. For example, instead of the humidity detecting unit 21, a detecting unit for outputting a signal in response to a physical characteristic other than humidity may be used. Also, instead of the moisture sensitive film 86, a physical-characteristic detecting film in which a permittivity varies in response to a physical characteristic other than humidity may be used.

In the present disclosure, with respect to the term "cover" or "on" that involves a positional relationship between given two elements, such a term means both cases where a first element is disposed on a surface of a second element indirectly via other element(s) and where a first element is disposed on a surface of a second element directly.

Explanation has been provided above for the present disclosure in relation to one or more embodiments. However, the present disclosure is not limited to the embodiments as described, and changes or alternatives can be made within the spirit of the present disclosure.

What is claimed is:

1. A detecting device comprising:
    a detecting unit including a first electrode and a second electrode, the first electrode and the second electrode being used as a first capacitor, the first electrode being electrically coupled to a first drive terminal, the second electrode being electrically coupled to a signal terminal, and the first capacitor being configured to change capacitance in response to a physical characteristic;
    a drive unit configured to apply a first drive signal to the first drive terminal such that the first drive signal is alternately inverted between a first period and a second period;
    a converting unit configured to convert a charge charged at the signal terminal into a voltage, the converting unit being configured to produce a first output voltage during the first period and a second output voltage during the second period, the second output voltage being an inverted voltage with respect to the first output voltage;
    a difference processing unit configured to obtain a difference between the first output voltage and the second output voltage, the difference processing unit being an AD converter including a first input terminal and a second input terminal;
    a first sample and hold circuit electrically coupled to the first input terminal of the AD converter; and
    a second sample and hold circuit electrically coupled to the second input terminal of the AD converter,
    wherein the first sample and hold circuit and the second sample and hold circuit are each configured to selectively sample and hold a given output voltage among the first output voltage and the second output voltage, and
    wherein the AD converter is configured to convert, into a digital signal, a difference between an output voltage of the first sample and hold circuit and an output voltage of the second sample and hold circuit and to output the digital signal.

2. The detecting device according to claim 1, further comprising a second drive terminal; and
    a third electrode electrically coupled to the second drive terminal,
    wherein the third electrode and the second electrode constitutes a second capacitor, the second capacitor being configured to provide constant capacitance that does not vary in response to the physical characteristic, and wherein the drive unit is configured to apply a second drive signal to the second drive terminal, the second drive signal having an opposite phase of the first drive signal.

3. The detecting device according to claim 2, further comprising:
a substrate above which the third electrode is disposed;
an insulating film via which the second electrode is disposed above the third electrode; and
a moisture sensitive film via which the first electrode is disposed above the second electrode.

4. The detecting device according to claim 3, wherein the first capacitor and the second capacitor are configured as a first semiconductor chip, and wherein the drive unit and the converting unit are configured as a second semiconductor chip.

5. The detecting device according to claim 4, wherein the first semiconductor chip is disposed over the second semiconductor chip.

6. The detecting device according to claim 1, wherein the physical characteristic includes humidity.

7. The detecting device according to claim 1, further comprising a shield interconnect having a constant potential,
wherein the converting unit includes a first converting unit including a converting unit first capacitor and includes a second converting unit including a converting unit second capacitor, the shield interconnect being disposed between the converting unit first capacitor and the converting unit second capacitor, the first converting unit being configured to operate in the first period to convert the charge into the voltage, and the second converting unit being configured to operate in the second period to convert the charge into the voltage.

8. A detecting device comprising:
a detecting unit including a first electrode and a second electrode, the first electrode and the second electrode being used as a first capacitor, the first electrode being electrically coupled to a first drive terminal, the second electrode being electrically coupled to a signal terminal, and the first capacitor being configured to change capacitance in response to a physical characteristic;
a drive unit configured to apply a first drive signal to the first drive terminal such that the first drive signal is alternately inverted between a first period and a second period;
a converting unit configured to convert a charge charged at the signal terminal into a voltage, the converting unit being configured to produce a first output voltage during the first period and a second output voltage during the second period, the second output voltage being an inverted voltage with respect to the first output voltage; and
a difference processing unit configured to obtain a difference between the first output voltage and the second output voltage,
wherein the converting unit includes
a first input terminal,
an output terminal,
a second capacitor electrically coupled between the first input terminal and the output terminal, and
a switch electrically coupled in parallel with the second capacitor,
wherein the first period includes a first reset period and a first charge-transfer period,
wherein the second period includes a second reset period and a second charge-transfer period,
wherein during both the first reset period and the second reset period, the switch is configured to be turned on to discharge the second capacitor, and during both the first charge-transfer period and the second charge-transfer period, the switch is configured to be turned off to cause the second capacitor to be chargeable so that a charge output from the signal terminal is transferred to the second capacitor.

9. The detecting device according to claim 8, further comprising a second drive terminal; and
a third electrode electrically coupled to the second drive terminal,
wherein the third electrode and the second electrode being used as a third capacitor, the third capacitor being configured to provide constant capacitance that does not vary in response to the physical characteristic, and
wherein the drive unit is configured to apply a second drive signal to the second drive terminal, the second drive signal having an opposite phase of the first drive signal.

10. The detecting device according to claim 9, further comprising:
a substrate above which the third electrode is disposed;
an insulating film via which the second electrode is disposed above the third electrode; and
a moisture sensitive film via which the first electrode is disposed above the second electrode.

11. The detecting device according to claim 10, wherein the first capacitor and the second capacitor are configured as a first semiconductor chip, and wherein the drive unit and the converting unit are configured as a second semiconductor chip.

12. The detecting device according to claim 11, wherein the first semiconductor chip is disposed over the second semiconductor chip.

13. The detecting device according to claim 8, wherein the difference processing unit includes a differential input type AD converter.

14. The detecting device according to claim 8, further comprising a sample and hold circuit configured to sample and hold both of the first output voltage and the second output voltage.

15. The detecting device according to claim 8, wherein the physical characteristic includes humidity.

16. The detecting device according to claim 8, further comprising a shield interconnect having a constant potential,
wherein the converting unit includes a first converting unit including a converting unit first capacitor and includes a second converting unit including a converting unit second capacitor, the shield interconnect being disposed between the converting unit first capacitor and the converting unit second capacitor, the first converting unit being configured to operate in the first period to convert the charge into the voltage, and the second converting unit being configured to operate in the second period to convert the charge into the voltage.

17. A detecting device comprising:
a detecting unit including a first electrode and a second electrode, the first electrode and the second electrode being used as a first capacitor, the first electrode being electrically coupled to a first drive terminal, the second electrode being electrically coupled to a signal terminal, and the first capacitor being configured to change capacitance in response to a physical characteristic;

a drive unit configured to apply a first drive signal to the first drive terminal such that the first drive signal is alternately inverted between a first period and a second period;

a converting unit configured to convert a charge charged at the signal terminal into a voltage, the converting unit being configured to produce a first output voltage during the first period and a second output voltage during the second period, the second output voltage being an inverted voltage with respect to the first output voltage; and a difference processing unit configured to obtain a difference between the first output voltage and the second output voltage, wherein the converting unit includes a capacitive element configured to store a charge on the signal terminal, the charge being for generating the first output voltage or the second output voltage, wherein the first period and second period respectively include a first charge-transfer period and a second charge-transfer period during which the charge on the signal terminal is transferred to the capacitive element, and wherein the first charge-transfer period and the second charge-transfer period have a same time length.

18. The detecting device according to claim 17, wherein the first charge-transfer period and the second charge-transfer period have the same time length such that the difference processing unit cancels a difference between an amount of variation in the first output voltage during the first charge-transfer period and an amount of variation in the second output voltage during the second charge-transfer period.

19. The detecting device according to claim 17, further comprising a second drive terminal; and a third electrode electrically coupled to the second drive terminal, wherein the third electrode and the second electrode being used as a second capacitor, the second capacitor being configured to provide constant capacitance that does not vary in response to the physical characteristic, and wherein the drive unit is configured to apply a second drive signal to the second drive terminal, the second drive signal having an opposite phase of the first drive signal.

20. The detecting device according to claim 17, further comprising a shield interconnect having a constant potential, wherein the converting unit includes a first converting unit including a converting unit first capacitor and includes a second converting unit including a converting unit second capacitor, the shield interconnect being disposed between the converting unit first capacitor and the converting unit second capacitor, the first converting unit being configured to operate in the first period to convert the charge into the voltage, and the second converting unit being configured to operate in the second period to convert the charge into the voltage.

* * * * *